US009984505B2

(12) United States Patent
Rimon et al.

(10) Patent No.: US 9,984,505 B2
(45) Date of Patent: May 29, 2018

(54) DISPLAY OF TEXT INFORMATION ON A HEAD-MOUNTED DISPLAY

(71) Applicant: Sony Interactive Entertainment Inc., Tokyo (JP)

(72) Inventors: Noam Rimon, San Mateo, CA (US); Jeffrey Roger Stafford, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 297 days.

(21) Appl. No.: 14/503,196

(22) Filed: Sep. 30, 2014

(65) Prior Publication Data

US 2016/0093105 A1 Mar. 31, 2016

(51) Int. Cl.
*G06T 19/00* (2011.01)
*G02B 27/01* (2006.01)
(Continued)

(52) U.S. Cl.
CPC .......... *G06T 19/006* (2013.01); *G02B 27/017* (2013.01); *G06F 3/012* (2013.01); *G06F 3/013* (2013.01); *G06F 3/017* (2013.01); *G06F 3/041* (2013.01); *G06F 3/0488* (2013.01); *G06F 3/04845* (2013.01); *G06T 11/60* (2013.01); *G02B 2027/0178* (2013.01); *G06F 2203/04806* (2013.01)

(58) Field of Classification Search
CPC ..... G06T 19/006; G06T 11/60; G02B 27/017; G06F 3/012; G06F 3/013
USPC ......................................................... 345/633
See application file for complete search history.

(56) References Cited

U.S. PATENT DOCUMENTS

2007/0276590 A1* 11/2007 Leonard ............... G01C 21/005
701/468
2011/0169947 A1* 7/2011 Gum ................... G06F 17/3087
348/135

(Continued)

FOREIGN PATENT DOCUMENTS

EP 2410490 A2 1/2012

OTHER PUBLICATIONS

Szalavari, Zsolt, "The Personal Interaction Panel—A Two-Handed Interface for Augmented Reality", Sep. 1997, EuroGraphics, vol. 16, pp. 1-12, [retrieved on Apr. 13, 2017], Retrieved from the Internet <URL:http://onlinelibrary.wiley.com/doi/10.1111/1467-8659.00137/full>.*

(Continued)

*Primary Examiner* — Barry Drennan
*Assistant Examiner* — Terrell Robinson
(74) *Attorney, Agent, or Firm* — Martine Penilla Group, LLP

(57) ABSTRACT

A method for presenting text information on a head-mounted display is provided, comprising: rendering a view of a virtual environment to the head-mounted display; tracking an orientation of the head-mounted display; tracking a gaze of a user of the head-mounted display; processing the gaze of the user and the orientation of the head-mounted display, to identify a gaze target in the virtual environment towards which the gaze of the user is directed; receiving text information for rendering on the head-mounted display; presenting the text information in the virtual environment in a vicinity of the gaze target.

30 Claims, 14 Drawing Sheets

(51) Int. Cl.
*G06F 3/01* (2006.01)
*G06T 11/60* (2006.01)
*G06F 3/041* (2006.01)
*G06F 3/0488* (2013.01)
*G06F 3/0484* (2013.01)

(56) References Cited

U.S. PATENT DOCUMENTS

| | | | | |
|---|---|---|---|---|
| 2012/0019557 A1* | 1/2012 | Aronsson | ............... | G06T 11/00 |
| | | | | 345/633 |
| 2013/0021373 A1 | 1/2013 | Vaught et al. | | |
| 2013/0128364 A1* | 5/2013 | Wheeler | ............... | A61B 3/113 |
| | | | | 359/630 |
| 2013/0241805 A1 | 9/2013 | Gomez | | |
| 2013/0328762 A1* | 12/2013 | McCulloch | .......... | G02B 27/017 |
| | | | | 345/156 |
| 2014/0098102 A1* | 4/2014 | Raffle | .................. | G06F 3/0482 |
| | | | | 345/440 |
| 2014/0364212 A1* | 12/2014 | Osman | ................. | A63F 13/213 |
| | | | | 463/31 |

OTHER PUBLICATIONS

Kim, Sooyoung, "Using Keyboards with Head Mounted Displays", Proceedings of the 2004 ACM SIGGRAPH International Conference on Virtual Reality Continuum and Its Applications in Industry, 2004, pp. 336-343, [retrieved on Sep. 15, 2017], Retrieved from the Internet<URL:http://dl.acm.org/citation.cfm?id=1044662>.*
PCT/US2015/051881 International Search Research Report and Written Opinion, dated Mar. 4, 2016, 17 pages.
Park et al, "Wearable Augmented Reality System Using Gaze Interaction", IEEE International Symposium on Mixed and Augmented Reality 2008, Sep. 15-18, 2008, 2 pages (pp. 175-176), Cambridge, UK.

* cited by examiner

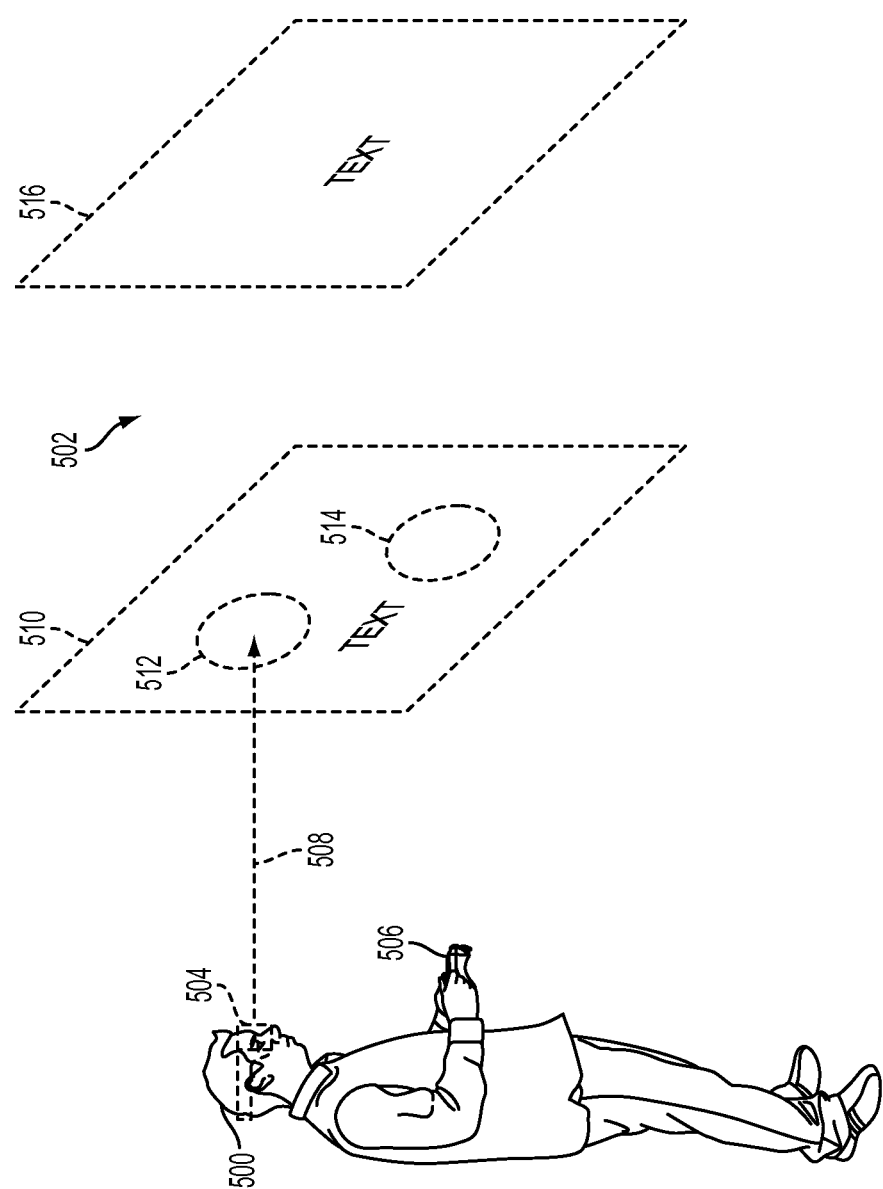

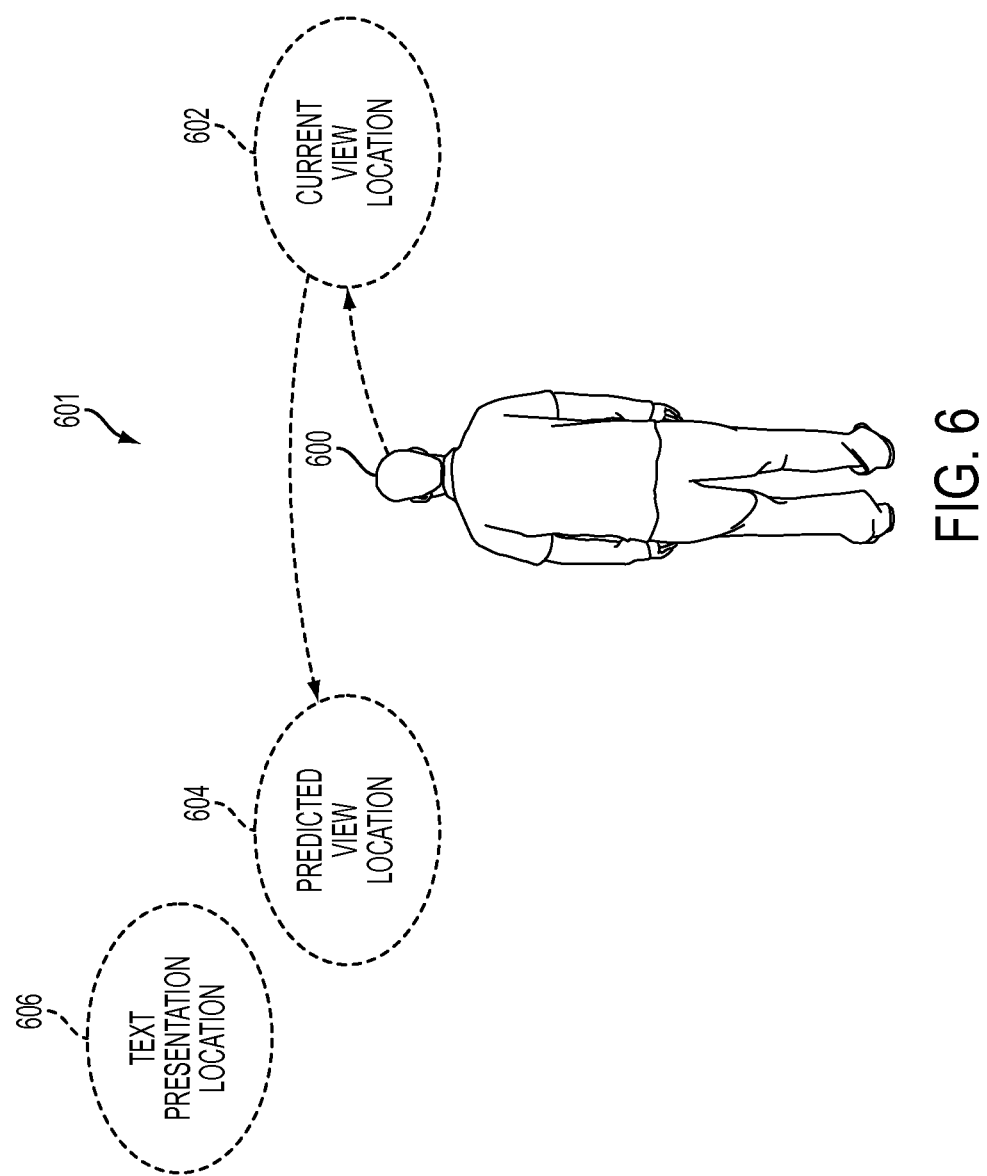

DISPLAY OF TEXT INFORMATION ON A HEAD-MOUNTED DISPLAY

BACKGROUND

1. Field of the Invention

The present invention relates to methods and systems for display of text information on a head-mounted display.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display. A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

Another growing trend in the industry involves the development of cloud-based gaming systems. Such systems may include a remote processing server that executes a game application, and communicates with a local thin client that can be configured to receive input from users and render video on a display.

It is in this context that embodiments of the invention arise.

SUMMARY

Embodiments of the present invention provide methods and systems for display of text information on a head-mounted display. It should be appreciated that the present invention can be implemented in numerous ways, such as a process, an apparatus, a system, a device or a method on a computer readable medium. Several inventive embodiments of the present invention are described below.

In one embodiment, a method for presenting text information on a head-mounted display is provided, comprising: rendering a view of a virtual environment to the head-mounted display; tracking an orientation of the head-mounted display; tracking a gaze of a user of the head-mounted display; processing the gaze of the user and the orientation of the head-mounted display, to identify a gaze target in the virtual environment towards which the gaze of the user is directed; receiving text information for rendering on the head-mounted display; presenting the text information in the virtual environment in a vicinity of the gaze target.

In one embodiment, the gaze target defines a view depth in the virtual environment, the view depth defined relative to a virtual viewpoint in the virtual environment that is defined for the head-mounted display and that defines a perspective from which the view of the virtual environment is rendered; wherein the text information is presented in the virtual environment at approximately the view depth.

In one embodiment, the text information is presented in the virtual environment at a lateral location relative to the gaze target.

In one embodiment, the text information is presented on an object in the virtual environment that is located at approximately the view depth.

In one embodiment, the text information is presented at substantially a location defined by the gaze target.

In one embodiment, the gaze target identifies an object in the virtual environment; and, the text information is presented on the object in the virtual environment.

In one embodiment, determining the orientation of the head-mounted display includes capturing images of the head-mounted display and analyzing the captured images of the head-mounted display.

In one embodiment, determining the orientation of the head-mounted display includes processing data received from at least one inertial sensor included in the head-mounted display.

In one embodiment, tracking the gaze of the user includes tracking an orientation of an eye of the user.

In one embodiment, the text information is defined by one or more of an instant message, an e-mail, a chat message, a social network feed.

In one embodiment, a method for displaying text on a head-mounted display is provided, comprising: rendering a view of a virtual environment on a head-mounted display; receiving text information for display to a user of the head-mounted display; tracking a location and orientation of a controller device in a vicinity of the head-mounted display; in response to the receiving text information, rendering, in the view of the virtual environment, a virtual display device, the virtual display device configured to display the text information, a location and orientation of the virtual display device in the virtual environment being controlled based on the tracked location and orientation of the controller device.

In one embodiment, the method further comprises: receiving input from a touch-sensitive surface of the controller device; processing the input to define an interaction with the text information as it is displayed on the virtual display device.

In one embodiment, the interaction with the text information is selected from scrolling the text information, moving the text information, adjusting a level of zoom, and selecting a portion of the text information.

In another embodiment, a method for displaying text on a head-mounted display is provided, comprising: rendering a view of a virtual environment to a head-mounted display; receiving text information for display on the head-mounted display; in response to the receiving text information, rendering an alert to the head-mounted display; detecting a predefined response to the alert; in response to detecting the predefined response to the alert, rendering the text information to the head-mounted display.

In one embodiment, the alert is defined by display of a visual indicator on the head-mounted display; the predefined response is defined by detection of a gaze direction of a user of the head-mounted display that is towards the visual indicator.

In one embodiment, the predefined response is defined by detection of a movement of a controller device towards the head-mounted display; wherein rendering the text information to the head-mounted display includes rendering, in the view of the virtual environment, a virtual display device that is configured to display the text information.

In one embodiment, a location and orientation of the virtual display device in the virtual environment are defined by a location and orientation of the controller device.

In one embodiment, in response to gesture input detected from a touch-sensitive surface of the controller device, an interaction with the rendered text information on the virtual display device is defined.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 5 conceptually illustrates a user interacting in a virtual environment, in accordance with an embodiment of the invention.

FIG. 6 conceptually illustrates a user 600 viewing a virtual environment 601, in accordance with an embodiment of the invention.

DETAILED DESCRIPTION

The following embodiments describe methods and apparatus for display of text information on a head-mounted display.

It will be obvious, however, to one skilled in the art, that the present invention may be practiced without some or all of these specific details. In other instances, well known process operations have not been described in detail in order not to unnecessarily obscure the present invention.

Figure 1:
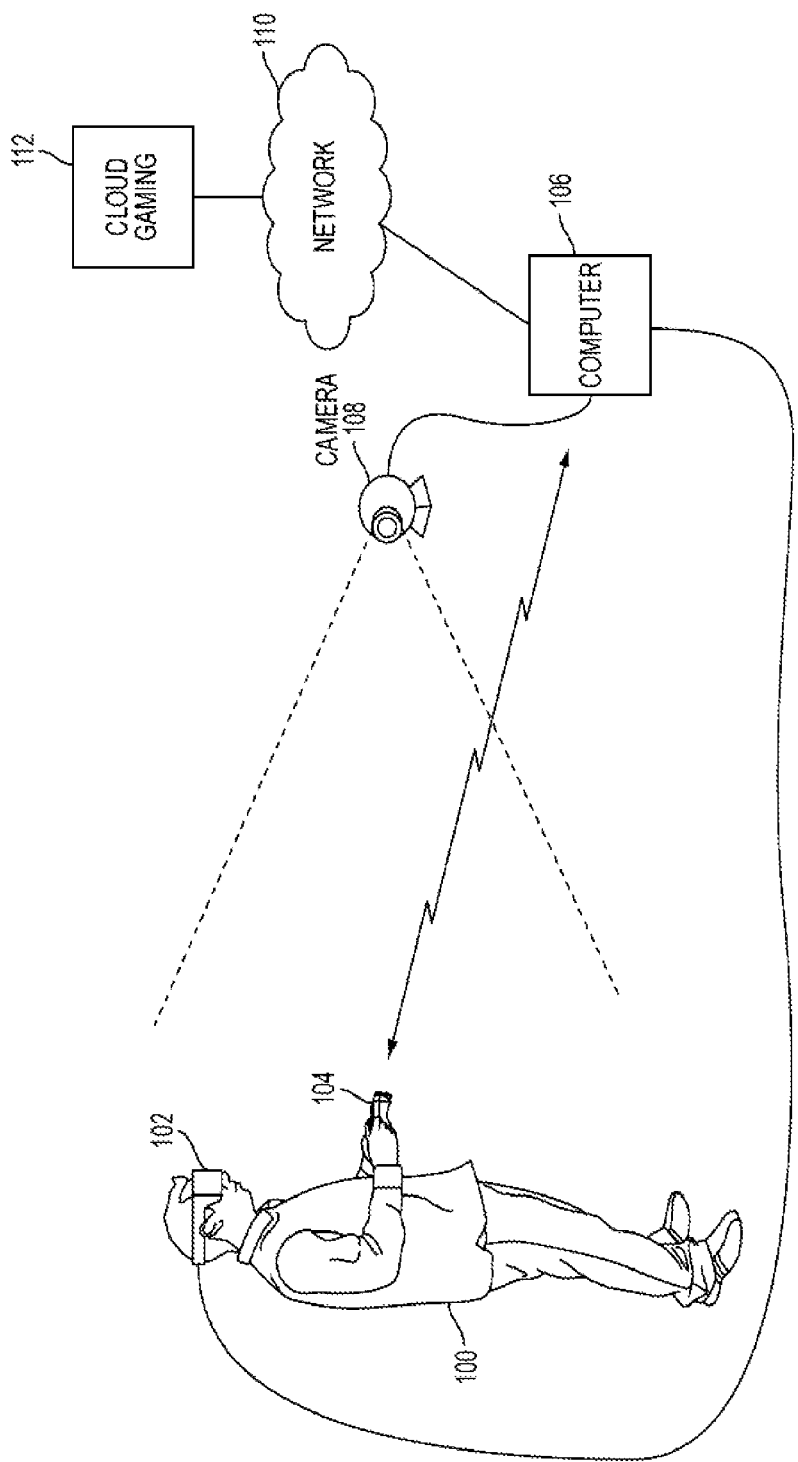
FIG. 1 illustrates a system for interactive gameplay of a video game, in accordance with an embodiment of the invention.

FIG. 1 illustrates a system for interactive gameplay of a video game, in accordance with an embodiment of the invention. A user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In one embodiment, the HMD 102 can be connected to a computer 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102.

The user 100 may operate a controller 104 to provide input for the video game. Additionally, a camera 108 can be configured to capture image of the interactive environment in which the user 100 is located. These captured images can be analyzed to determine the location and movements of the user 100, the HMD 102, and the controller 104. In one embodiment, the controller 104 includes a light which can be tracked to determine its location and orientation. Additionally, as described in further detail below, the HMD 102 may include one or more lights which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the video game being played by the user 102. The computer 106 transmits inputs from the HMD 102, the controller 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the controller 104.

In one embodiment, the HMD 102, controller 104, and camera 108, may themselves be networked devices that connect to the network 110 to communicate with the cloud gaming provider 112. For example, the computer 106 may be a local network device, such as a router, that does not otherwise perform video game processing, but facilitates passage of network traffic. The connections to the network by the HMD 102, controller 104, and camera 108 may be wired or wireless.

Figure 2:
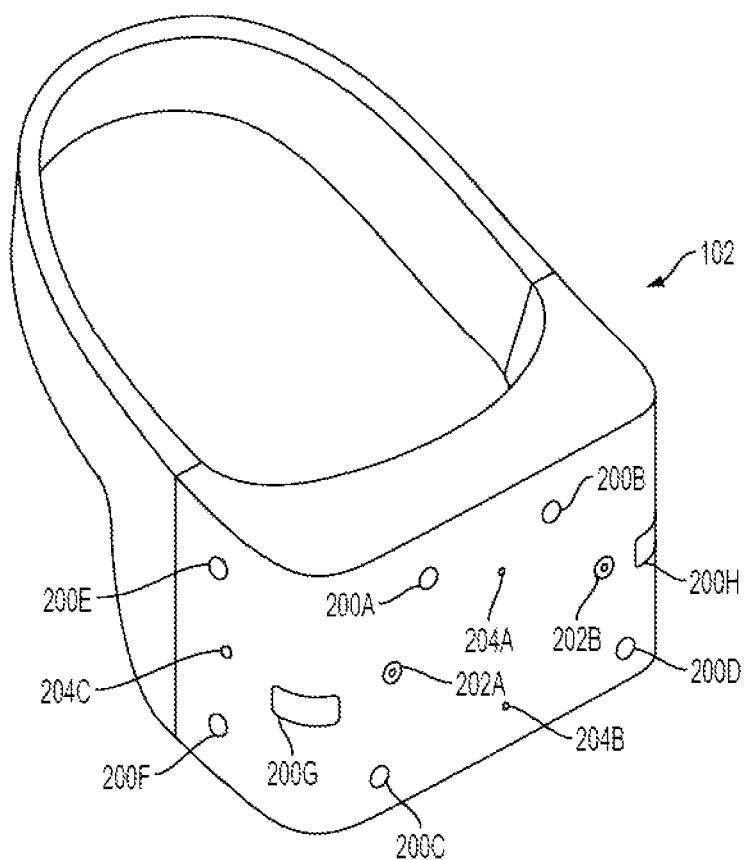
FIG. 2 illustrates a head-mounted display (HMD), in accordance with an embodiment of the invention.

FIG. 2 illustrates a head-mounted display (HMD), in accordance with an embodiment of the invention. As shown, the HMD 102 includes a plurality of lights 200A-H. Each of these lights may be configured to have specific shapes, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device.

Throughout the present disclosure, the terms "location," "orientation," and "position" may be utilized. Unless otherwise indicated or apparent from the context of the specific description in which the term is applied, these terms are defined as follows. The term "location" identifies a point or region of a spatial system, for example, at which an object is situated (i.e. where the object is "located"). In some implementations, a location can be defined by coordinates in a spatial coordinate system (e.g. (x,y,z) coordinates in a three-dimensional coordinate system). The term "orientation" identifies the directional pose of an object in a spatial system, which is independent of the object's location. "Orientation" can be defined by rotational aspects of an object such as pitch, yaw, and roll within a spatial system. The term "position" can identify location and/or orientation. However, it is noted that the term "position" can also be applied in other ways which may or may not be related to location/orientation (e.g. to identify a relative ranking, a configuration, etc.), and that such will be apparent from the context of the description in which the term is applied. Furthermore, it will be appreciated that the terms "location," "orientation," and "position" may be applied to a real space, a virtual space, and/or an augmented reality space.

In one embodiment, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. In the illustrated embodiment, the HMD 102 is shown to include image capture devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras installed on the HMD 102, oriented in any direction. For example, in another embodiment, there may be cameras mounted on the sides of the HMD 102 to provide additional panoramic image capture of the environment.

Figure 3:
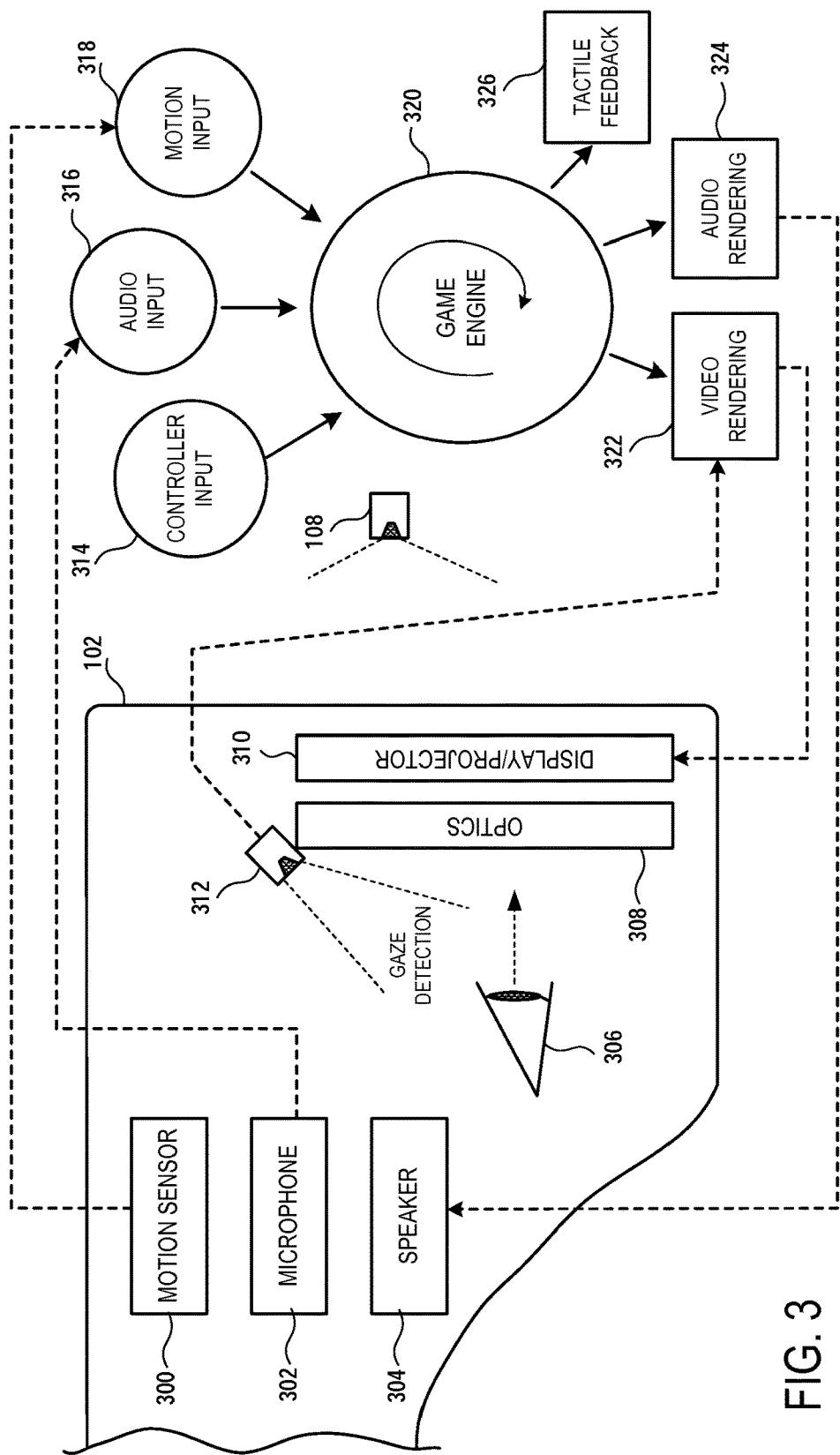
FIG. 3 conceptually illustrates the function of a HMD in conjunction with an executing video game, in accordance with an embodiment of the invention.

FIG. 3 conceptually illustrates the function of the HMD 102 in conjunction with an executing video game, in accordance with an embodiment of the invention. The executing video game is defined by a game engine 320 which receives inputs to update a game state of the video game. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine receives, by way of example, controller input 314, audio input 316 and motion input 318. The controller input 314 may be defined from the operation of a gaming controller separate from the HMD 102, such as controller 104. By way of example, controller input 314 may include directional inputs, button presses, trigger activation, movements, or other kinds of inputs processed from the operation of a gaming controller. The audio input 316 can be processed from a microphone 302 of the HMD 102, or from a microphone included in the image capture device 108. The motion input 318 can be processed from a motion sensor 300 included in the HMD 102, or from image capture device 108 as it captures images of the HMD 102. The game engine 320 receives inputs which are processed according to the configuration of the game engine to update the game state of the video game. The game engine 320 outputs game state data to various rendering modules which process the game state data to define content which will be presented to the user.

In the illustrated embodiment, a video rendering module 322 is defined to render a video stream for presentation on the HMD 102. The video stream may be presented by a display/projector mechanism 310, and viewed through optics 308 by the eye 306 of the user. An audio rendering module 324 is configured to render an audio stream for listening by the user. In one embodiment, the audio stream is output through a speaker 304 associated with the HMD 102. It should be appreciated that speaker 304 may take the form of an open air speaker, headphones, or any other kind of speaker capable of presenting audio.

In one embodiment, a gaze tracking camera 312 is included in the HMD 102 to enable tracking of the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head-mounted display, relative to a real environment in which the user is situated, and/or relative to a virtual environment that is being rendered on the head-mounted display.

Broadly speaking, analysis of images captured by the gaze tracking camera 312, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 326 is configured to provide signals to tactile feedback hardware included in either the HMD 102 or another device operated by the user, such as a controller 104. The tactile feedback may take the form of various kinds of tactile sensations, such as vibration feedback, temperature feedback, pressure feedback, etc.

As has been noted, the HMD device described herein is capable of providing a user with a highly immersive experience, enveloping a large proportion or even an entirety of a user's field of vision. Because of this immersive aspect of the HMD experience, it can be problematic to find ways to display text information to a user in a way that does not seem awkward or unnatural. Thus, in accordance with embodiments of the invention described herein, methods, apparatus, and systems are provided for the rendering of text on an HMD device.

It should be appreciated that the specific implementations described herein may be applied for the rendering of text from any source of text information. Merely for purposes of illustration, some representative examples of sources of text information and/or types of text information include the following: gaming related information such as in-game updates, score information, resource levels, energy levels, instructions, hints, in-game messages, player-to-player messaging/chat, captions, dialogue, player achievements, player status, etc., gaming and/or non-gaming social network activity such as posts, messages, friend requests, addition to a social graph, recent activity, popular activity, birthday reminders, social network app notifications, etc., mobile device (e.g. cellular phone, tablet, smartwatch, etc.) related information such as incoming calls, missed calls, alerts, notifications, text/SMS messages, chat messages, app notifications, etc., and other types of information such as calendar/schedule reminders, e-mail messages, receipt of any of the foregoing, combinations of any of the foregoing, etc.

Figure 4:
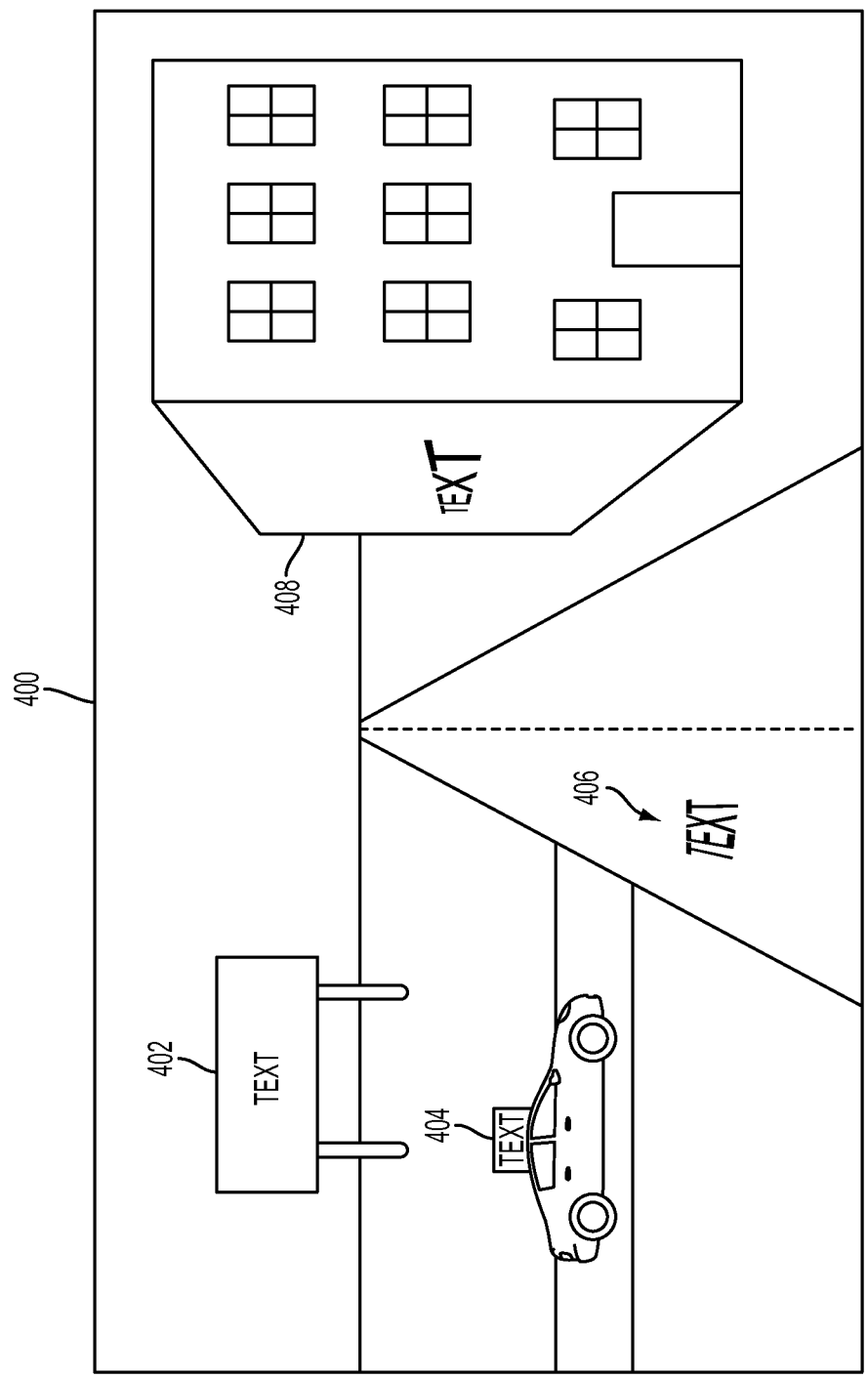
FIG. 4 illustrates a view of the virtual environment which can be rendered on an HMD device, in accordance with an embodiment of the invention.

FIG. 4 illustrates a view of the virtual environment which can be rendered on an HMD device, in accordance with an embodiment of the invention. In accordance with some embodiments, text information can be displayed on any objects or surfaces that exist within a virtual environment. The display of text information in this manner can provide for rendering of text in a manner that is integrated into the context of the virtual environment. In the illustrated view 400 of the virtual environment, the virtual scene is shown including various objects on which text information can be displayed. For example, a billboard sign 402 can be configured to display text information. Another sign 404 is situated atop a car and may also be configured to display text information. As another example, text information can be displayed on a roadway as shown at reference 406. Furthermore, in the illustrated embodiment, text information can be rendered on a side surface 408 of a building in the virtual scene. These are merely some examples of objects and surfaces upon which text information can be rendered in a virtual environment. It should be appreciated that text information can be displayed on any type of object or surface that exists within a virtual environment.

Furthermore, that the particular objects or surfaces upon which text information is rendered can be selected or determined in real-time based at least in part on a user's view direction within the virtual environment. That is, in accordance with some embodiments, objects or surfaces that are within a current view of the user may be selected for rendering of text thereon, whereas objects or surfaces that are not within a current view of the user will not be selected. In some implementations, a predicted view of the user in the virtual environment can be determined, and objects or surfaces that lie within the predicted view of the user can be selected for display of text thereon, whereas objects or surfaces that do not lie within the predicted view of the user will not be selected for display of text thereon.

It will be appreciated that text information can be rendered on any type of object, article, or surface in a virtual environment, without limitation. Certain types of real world objects are inherently associated with or configured for the display of text information. When such objects are rendered in a virtual environment, they can be utilized to provide a natural and intuitive location for the display of text information. Examples of such objects include, without limitation, the following: papers, books, magazines, posters, signs, decals, electronic displays, televisions, computer monitors and displays, projectors and projector screens, cellular phones, mobile devices, laptops, tablets, personal digital assistants (PDA), wristwatches, any object having a display screen, etc. In some implementations, such objects are prioritized over other objects during the process of selecting from among available objects lying within the user's view of the virtual environment. That is, for a given user's view of the virtual environment, objects within the user's view are identified and evaluated. Then, objects that are specifically configured to display text information are prioritized for such display as compared to other types of objects which are not specifically configured to display text information. Additionally, objects that are situated at a location corresponding to the user's view direction in the virtual environment may be further prioritized for the rendering of text information over other objects that are not so situated.

As has been noted, any type of object, article, or surface in a virtual environment can be utilized to display text information. Merely by way of example, without limitation, such objects/surfaces can include any of the following: environmental features, ground surfaces, roads, paths, walkways, hallways, vehicles, weapons, buildings, structures, furniture, fixtures, etc. In some implementations, certain objects may be prioritized over other objects for the purposes of rendering text information based on the area of available flat surface region on the objects. For example, objects having larger substantially flat surface regions may be prioritized over objects having smaller substantially flat surface regions.

In some embodiments, the size of an available surface region of an object is considered in combination with the amount of text information that is to be displayed. For example, in some embodiments, a surface region that is appropriately sized to fit the text information is selected. In one embodiment, this can be defined as the smallest surface region, from amongst the available surface regions, that accommodates the text information in full when rendered at a predefined or preferred font size. It will be appreciated that the rendering of text on such surfaces may be subject to additional predefined settings/constraints such as margins, spacing, font, etc. and that accommodation of text information is based on the application of such predefined settings.

It will be appreciated that any of the factors described herein which may be considered for purposes of prioritization may be combined with any other factors. For purposes of brevity, all such combinations are not described in detail herein, but it should be understood that embodiments encompassing such combinations are contemplated as additional embodiments of the invention.

FIG. 5 conceptually illustrates a user interacting in a virtual environment, in accordance with an embodiment of the invention. The user 500 is wearing an HMD device 504, and views and interacts with the virtual environment 502 through the HMD device 504. The view of the virtual environment 502 that is presented through the HMD device 504 is defined from a virtual viewpoint in the virtual environment 502. The location and direction of the virtual viewpoint can be controlled in response to user input, such as motion input detected from the HMD device and/or input provided via a separate controller device 506. Though the user 500 does not exist within the virtual environment 502 in a literal sense, for purposes of the present disclosure, it is convenient to nonetheless refer to the location of the user 500 in the virtual environment 502. It will be understood by those skilled in the art that the location of the user in the virtual environment 502 can be synonymous with the aforementioned virtual viewpoint.

Broadly speaking, in some embodiments, the location and direction of the virtual viewpoint are controlled based on the tracked location and orientation of the HMD device 504, in combination with additional user input such as that from a controller device 506, but exclusive of gaze tracking of the user's eyes relative to the HMD device 504. In other words, the scope of the view of the virtual environment 502 that is presented through the HMD device 504 will change as the user 500 moves his head to different locations and orientations, but will not substantially change if the user only moves his or her eyes without providing another kind of input which would affect the location or orientation of the user's corresponding virtual viewpoint in the virtual environment 502. However, in other embodiments, the scope of the view of the virtual environment that is rendered on the HMD device 504 is defined based on the tracked location and orientation of the HMD device 504 in combination with gaze tracking of the user's eyes relative to the HMD device 504. It should be appreciated that for purposes of the present disclosure, reference to gaze tracking of the user's eyes relative to the HMD device 504 is intended to encompass tracking of the movements of a user's eyes which are relative to or detected from any particular apparatus of the HMD device 504, e.g. a gaze tracking camera which captures images of the user's eyes that are analyzed for gaze tracking purposes.

In accordance with the foregoing discussion, it will be understood that the direction of a virtual viewpoint that is associated with the user 500 can be different from the actual view direction (conceptually shown at reference 508) of the user 500 in the virtual environment 502, as the user's eyes are able to move independently of the user's head. Thus, in at least some embodiments, the direction of the virtual viewpoint is determined primarily by the orientation of the user's head, whereas the user's actual view direction 508 is determined by the combination of the orientation of the user's head as well as the gaze orientation of the user's eyes relative to the HMD 500. In the present disclosure, reference will be made to the view/gaze direction of the user in the virtual environment, which is the direction within the virtual environment towards which it is determined that the user is looking. As will be understood from the foregoing discussion, the view direction of the user can be determined based on the location and orientation of the HMD device 504, gaze input which tracks the gaze of the user relative to the HMD device 504, and/or user input received from additional input devices such as controller 506.

With continued reference to FIG. 5, the view direction 508 in the virtual environment 502 of the user 500 has been determined, and as such, a region 512 is identified towards which the view direction 508 is directed. The region 512 exists at a depth 510 relative to the location of the user 500.

In some embodiments, the depth of a location towards which the user is looking can be determined based on the positions of the user's eyes. Furthermore, in some embodiments, the view direction of the user and the virtual environment can be extrapolated until it intersects with an object in the virtual environment. It may be reasonably assumed that the user is thus looking at the identified object in the virtual environment, and the depth of that object can be identified as the depth at which the user 500 is currently viewing in the virtual environment 502.

In some embodiments, text can be displayed or rendered on the object at which is it is determined that the user is looking. In some embodiments, text is rendered in the region 512 towards which it is determined that the view direction of the user 500 is directed. In some embodiments, text information is rendered at the depth 510 at which it is determined that the user is currently looking. By rendering text information at the current viewing depth of the user, the text information will be in focus for the user without requiring the user to change focus to a different depth in the virtual environment. In some embodiments, text information is displayed at the depth 510, but at a location that is lateral to the region 512 towards which the user is currently looking, such as a region 514 in the illustrated embodiment. In this manner, text is displayed at the user's current viewing depth so as to be substantially in focus for the user, but laterally located to a side and/or above or below of where the user is currently looking, so as not to obstruct the region which the user is currently viewing.

In another embodiment, text information is displayed at a depth that is greater than the current viewing depth of the user 500, for example, at a depth 516 as indicated with continued reference to FIG. 5. In this manner, the text information will appear in the background relative to the location that the user is currently viewing. This may provide for a non-intrusive presentation of text that can be noticed by the user in the background, but which does not obstruct or otherwise interfere with the user's currently viewed region of the interactive environment.

FIG. 6 conceptually illustrates a user 600 viewing a virtual environment 601, in accordance with an embodiment of the invention. In accordance with embodiments herein, the user 600 can be wearing an HMD device (not shown). The user's current view location 602 in the virtual environment 601 can be identified, as has been discussed, based on various input and factors, including the tracked location and orientation of the HMD device, gaze tracking of the user's eyes, identification of objects or points of interest within the virtual environment and the intersection of the user's view direction therewith, etc. The current view location 602 is the identified region towards which the view direction of the user is currently directed, i.e. the location towards which the user is determined to be looking). In various embodiments, the current view location 602 can be defined by a point, two-dimensional coordinates, three-dimensional coordinates, a two-dimensional region, a three-dimensional region, an object, a point of interest, a surface, or any other identifying form or item towards which the user is determined to be looking.

In accordance with embodiments of the invention, a predicted view location 604 can be determined for the user 600. The predicted view location 604 is a location that the user is predicted to view at some time in the future. In some embodiments, the predicted view location 604 can be proximate to the current view location 602, and may be accessible for viewing by simple movements or actions, such as turning of the user's head, or continuing travel in a given direction or on a given path. In other embodiments, the predicted view location can be distant from the current view location 602, or otherwise accessible for viewing through more complex activity.

Text information can be presented at a text presentation location 606 that is determined based at least in part on the predicted view location 604. The text presentation location 606 can be at (or the same as) the predicted view location 604, proximate to the predicted view location 604, adjacent to the predicted view location, in front of or behind the predicted view location, or otherwise located based on the predicted view location 604.

The predicted view location 604 can be determined based on any of a variety of factors. In some embodiments, the predicted view location may be determined at least in part based on events occurring during gameplay of a video game, including events controlled by the computer game and events controlled by the user (e.g. events occurring in response to user input), as well as user input. For example, in one embodiment, a user-controlled activity can be extrapolated to predicted future values or settings for the activity, based on current values or settings for the activity. For example, if a user initiates a turn in a given direction, then the turning activity can be extrapolated to a future turned state, and as a result, the predicted view location can be determined. In another example, if a user is traveling in a given direction at a given rate, then these can be extrapolated to identify a predicted location of the user, and the predicted view location 604 can be accordingly determined based on the predicted location of the user. In the foregoing example, it should be appreciated that the location of the user can be that of the user in the virtual environment, or a character or vehicle or other object under control of the user in the virtual environment, etc.

In various other embodiments, the predicted view location 604 can be determined based on game-related activity including, but not limited to, the following: location or movement or activity of a user, location or movement or activity of a character/avatar/vehicle or other object under control of the user, a current level or scene of the game, a current amount of completion of the game/level/scene or portion thereof, a predicted future location of the user, a predicted future location of a character/avatar/vehicle or other object under control of the user, an expected sequence of in-game activity or achievements, etc. Text information can be presented at, or proximate to, or be otherwise accessible from, the predicted view location.

Figure 7A:
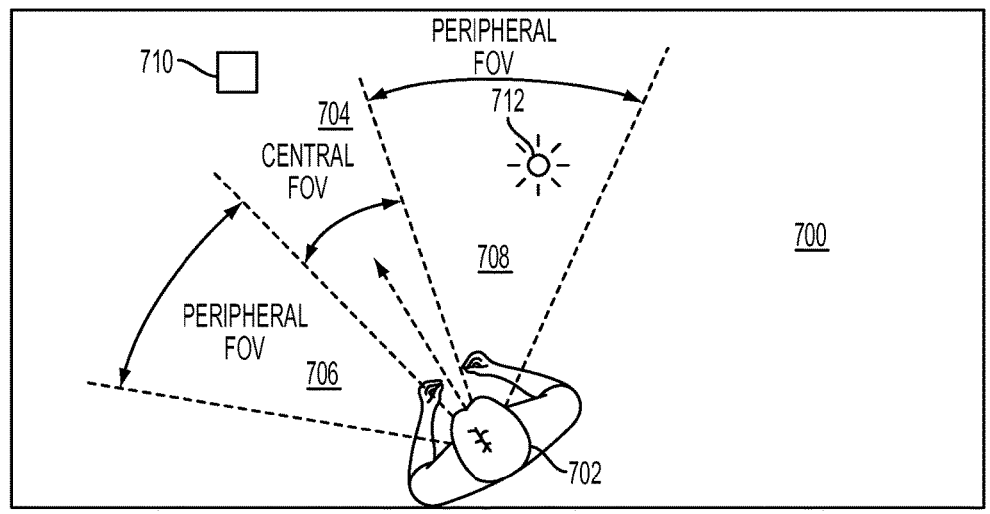
FIGS. 7A and 7B illustrate the use of a visual alert to trigger display of text in a virtual environment, in accordance with an embodiment of the invention.
Figure 7B:
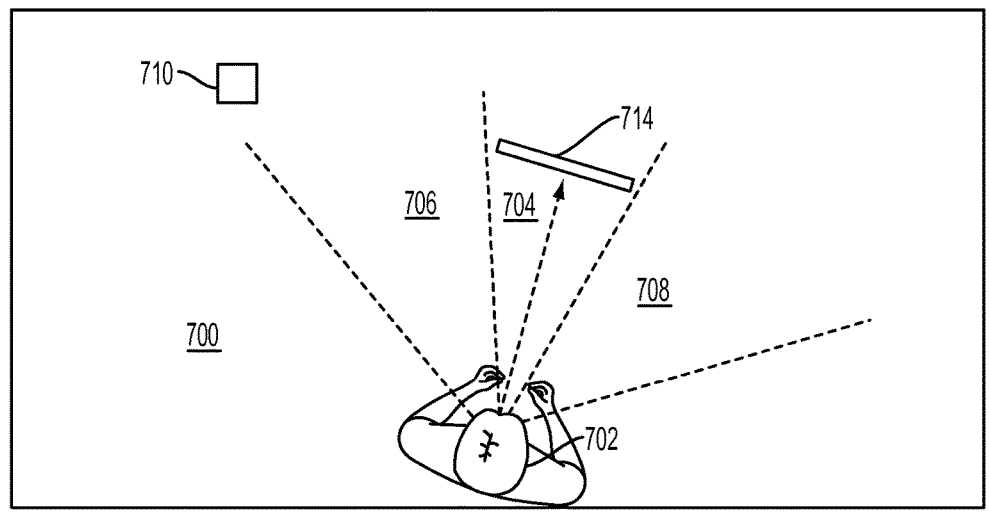

FIGS. 7A and 7B illustrate the use of a visual alert to trigger display of text in a virtual environment, in accordance with an embodiment of the invention. FIG. 7A illustrates an overhead view of a user 702 interacting in a virtual environment 700, in accordance with an embodiment of the invention. The user 702 (or the virtual viewpoint controlled by the user) is oriented in the virtual environment 700 so as to have a central field of view 704. By way of example, the user 702 may be looking at an object 710 that is in the central field of view 704 as shown at FIG. 7A. When the user 702 is thus oriented, the user also has a peripheral field of view 706 and a peripheral field of view 708.

It should be appreciated that though the peripheral fields of view as shown and described are to the sides of the user's central field of view 704, the peripheral field of view of the user also extends to portions which are above and below the user's central field of view 704. The user's central field of view 704 can be conceptually understood as a conical region of space, having an approximately circular/elliptical/oval-type cross-section, extending in the user's view direction, from a vertex that is located at approximately the user's location in the virtual environment (the user's virtual viewpoint). The user's peripheral field of view can thus also be understood as a conical region extending from the same vertex, but encompassing (having a larger cross-section for a given depth), and excluding, the region defined by the central field of view.

In one embodiment, a visual indicator 712 can be displayed in the peripheral field of view 708 of the user 702, indicating that there is text information for the user 702 to view. Because the visual indicator 712 is located in the user's peripheral field of view 708, the visual indicator 712 will not be overly distracting to the user or obscure objects in the user's central field of view 704 which the user may be currently viewing or on which the user's attention may be currently focused. However, the visual indicator 712 will still be visible to the user 702 in his/her peripheral vision and alert the user 702 to the existence of text information for viewing.

It will be appreciated that the visual indicator can be any type of visual element rendered in the virtual environment which may function to alert the user. The visual indicator can be or may include any of the following elements or characteristics, without limitation, including: a beacon, a light, an object, text, predefined color, selected color to contrast with surrounding scene, predefined pattern, flashing, motion effect, etc.

In response to seeing the visual indicator 712 in the user's peripheral vision, the user 702 may turn to look in the direction of the visual indicator 712, as shown at FIG. 7B. As can be seen, the user 702 has turned his view direction towards the location of the visual indicator 712 in the virtual environment 700, so that the users central field of view 704 is now directed towards location of the visual indicator 712. The object 710 is now located in the user's peripheral field of view 706. In some embodiments, when the user 702 reorients his view direction so as to be substantially directed towards the location of the visual indicator 712, the visual indicator 712 is replaced with text information 714. In this manner, the visual indicator 712 calls attention to the fact that there is text information for display to the user 702, and when the user 702 turns to view the visual indicator 712, the text information is rendered in the virtual environment for viewing by the user 702.

In some embodiments, the text information 714 can be configured to be rendered in a manner that occupies the user central field of view 704. In some embodiments, the text information 714 is rendered at a depth relative to the user 702 that is substantially similar to a depth of an object which the user was viewing prior to viewing the text information, such as object 710 in the illustrated embodiment.

Though the foregoing implementations have been described with reference to a visual indicator that is rendered in the virtual environment, it will be appreciated that in other implementations, other types of indicators can be utilized in the alternative or in conjunction with a visual indicator. For example, an audio indicator or alert can be provided to the user. In some implementations, an audio indicator can be configured so as to emanate from a location within the virtual environment that is substantially the same or similar to that of the aforementioned visual indicator 712. That is, the audio indicator can be configured to emanate from a location at which text information will be displayed when the user directs his view direction or central field of view towards that location. It should be appreciated that an audio indicator as thus described can be utilized in conjunction with the aforementioned visual indicator, or utilized independently in other implementations.

Figure 8A:
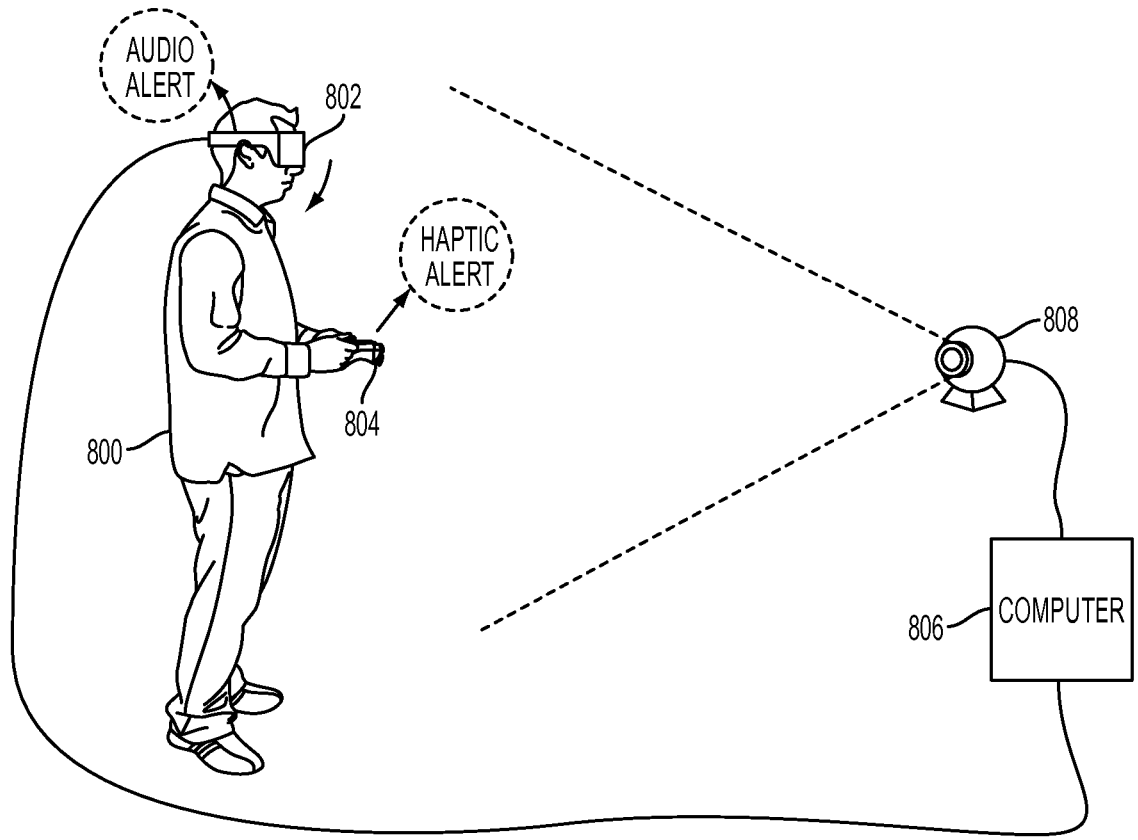
FIG. 8A illustrates a user 800 interacting with a virtual environment via an HMD device 802 and operating a controller 804, in accordance with an embodiment of the invention.

In some implementations, text information can be rendered to a user on a virtual device in a virtual environment. FIG. 8A illustrates a user 800 interacting with a virtual environment via an HMD device 802 and operating a controller 804, in accordance with an embodiment of the invention. As shown, the HMD device 802 can be connected to a computing device 806, which can be configured to send and receive data from the HMD device 802. Also shown is an image capture device 808 that is configured to capture images of the interactive environment, including the HMD device 802 and the controller device 804. In some implementations, the locations and/or orientations of the HMD device 802 and the controller device 804 can be determined at least in part based on analysis of the captured images.

In some implementations, the user 800 may receive an alert that text information is available for viewing, such as an audio alert rendered through the HMD device 802 or the controller device 804, a visual alert rendered in the virtual environment in which the user 800 is interacting (including visual indicators presented on virtual headgear represented in the virtual environment, such as virtual glasses, a virtual helmet, a virtual visor, and the like), or a haptic feedback alert that is rendered through the controller device 804 (e.g. vibration of the controller device 804).

In response to receiving the alert, the user 800 may look down towards the controller device 804, and/or bring up the controller device 804 for viewing. As shown with reference to FIG. 8B, in the view 810 of the virtual environment 812 that is rendered to the user on the HMD device 802, the controller device 804 is replaced with or shown as a virtual device 814 having a display screen 816 for displaying the text information. That is, the controller device 804 is rendered as a virtual device 814 in the virtual environment 812 that is being viewed by the user 800 through the HMD device 802. Thus, when the real world view direction of the user 800 is towards the controller device 804, then in the virtual environment 812 the user 800 will see the virtual device 814 rendered in its place.

It should be appreciated that the virtual device 814 can be configured to be maneuverable in the virtual environment 812 by the user 800 in response to detected movement of the controller device 804 by the user 800. The present implementations provide for a natural and intuitive way to present text information to the user 800. For the text information is displayed on a device in the virtual environment in much the same way that text information is often displayed on physical display devices in the real world. In various implementations, the display device 814 can be any type of device configured to display text information, including the following, without limitation: a mobile device, cellular phone, personal digital assistant (PDA), tablet computer, laptop computer, smart watch, portable gaming device, etc.

Additionally, though a display device has been described in the aforementioned implementations, it is contemplated that in other embodiments, other types of objects on which text information is displayed can be rendered in the virtual environment in place of the controller device 804. For example, a print media object such as a book, magazine, newspaper, folder, note, notepad, poster, placard, paper, envelope, or any other type of object that is configured to display print media, can be utilized. The rendering of text on such objects provides for an intuitive mechanism by which text information can be displayed in a virtual environment to the user.

As noted, the movement of the virtual device 814 can be determined based on movement of the controller device 804. In one embodiment, the movement of the virtual device 814 in the virtual environment 812 is determined in such a manner as to be substantially similar to detected movement of the controller device 804 in the real-world interactive environment. This provides to the user 800 a sense of control of the location/orientation of the virtual device 814 in the virtual environment. Furthermore, it will be appreciated that as the device 814 is maneuvered, it is rendered with proper three-dimensional perspective distortion. This also applies to text information that is rendered on the virtual device 814. That is, the text information will be rendered with appropriate three-dimensional perspective distortion as the text information is rendered on, and moved with, the virtual device 814 in the virtual environment 812.

Figure 8B:
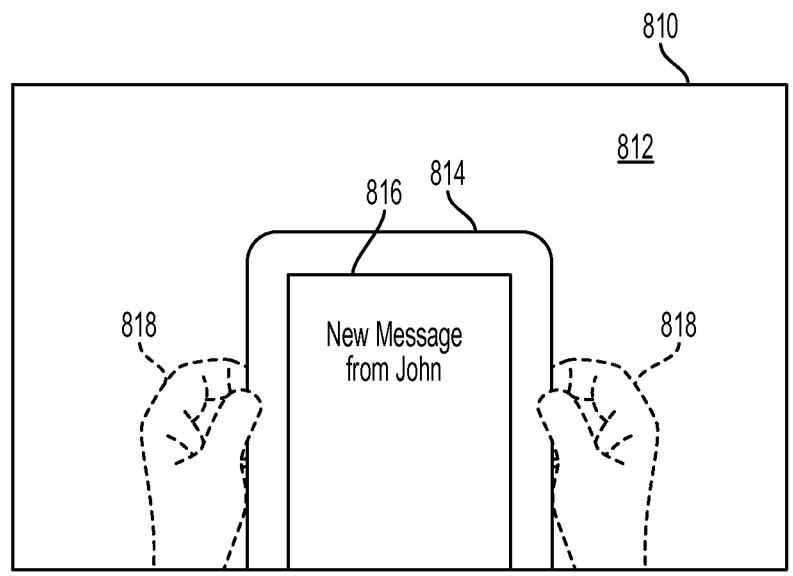
FIG. 8B illustrates a view of a virtual environment, in which a controller device is replaced with or shown as a virtual device having a display screen for displaying the text information.

With continued reference to FIG. 8B, in some implementations, virtual representations of the user's hands 818 can be rendered in the view 810 of the virtual environment 812 that is being displayed to the user 800. The rendering of the virtual representations of the user's hands can be defined from images of the user's hands captured by a camera on the HMD device 802. In some implementations, the actual images of the user's hands are shown. Whereas in other embodiments, other representations of hands or similarly functioning appendages can be shown, e.g. a virtual model of the user's hands, the hands of a virtual character that is controlled by the user, a set of virtual gloves, etc.

In some implementations, the virtual representations of the user's hands 818 are rendered in a manner so as not to obscure the user's view of the display device 814 or other objects in the virtual environment 812. This can be accomplished in various ways, such as by rendering the virtual representations of the user's hands in a translucent manner, rendering outlines of the virtual representations, etc.

It will be appreciated that the positioning and movement of the virtual representations of the user's hands 818 can be controlled based on the actual positioning and movement of the user's actual hands, and/or input received at the controller device 804. As noted, the positioning and movement of the user's hands can be tracked, at least in part, based on analysis of images captured by an image capture device mounted on the HMD device 802. Furthermore, the positioning and movement of the user's hands can also be tracked, at least in part, based on analysis of images of the interactive environment in which the user 800 is situated that are captured by the image capture device 808. In some implementations, the virtual representations of the user's hands are configured to be positioned and to move (in the virtual environment) in a substantially similar manner as the user's actual hands (in the real-world interactive environment). In other implementations, particularly when data about the user's actual hands is limited or unavailable (e.g. when only input received at the controller device is utilized for this purpose), then the positioning and movement of the virtual representations of the user's hands 818 can be implied or otherwise determined based on the available data. For example, as the user moves the controller device 804, and the virtual display device 814 moves in a similar fashion in the virtual environment, then the virtual representations of the user's hands can be animated so as to portray them moving the virtual display device 814.

Figure 8C:
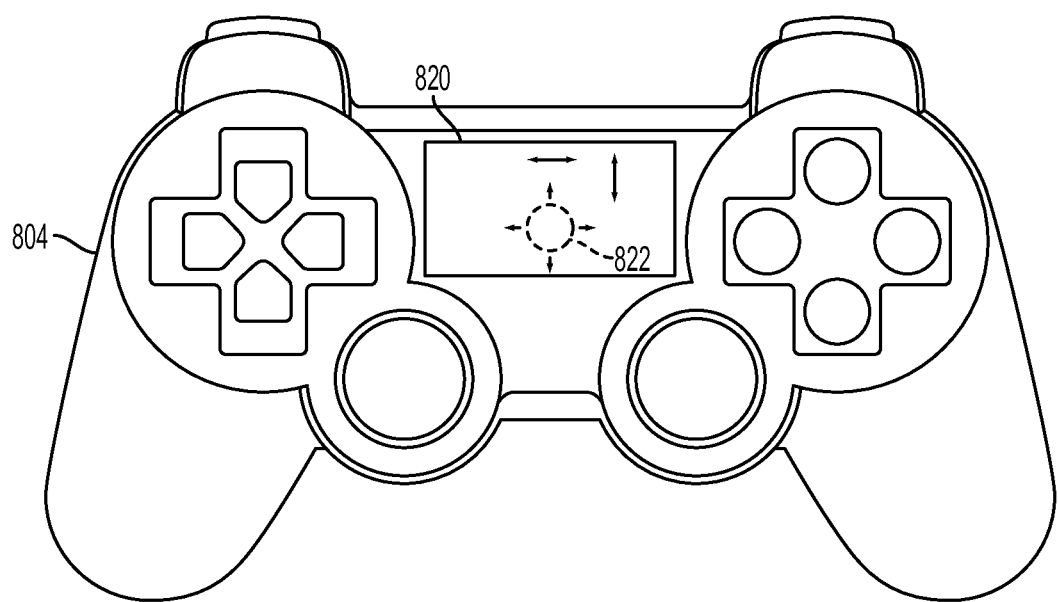
FIG. 8C illustrates a top view of a controller device, in accordance with an embodiment of the invention.
Figure 8D:
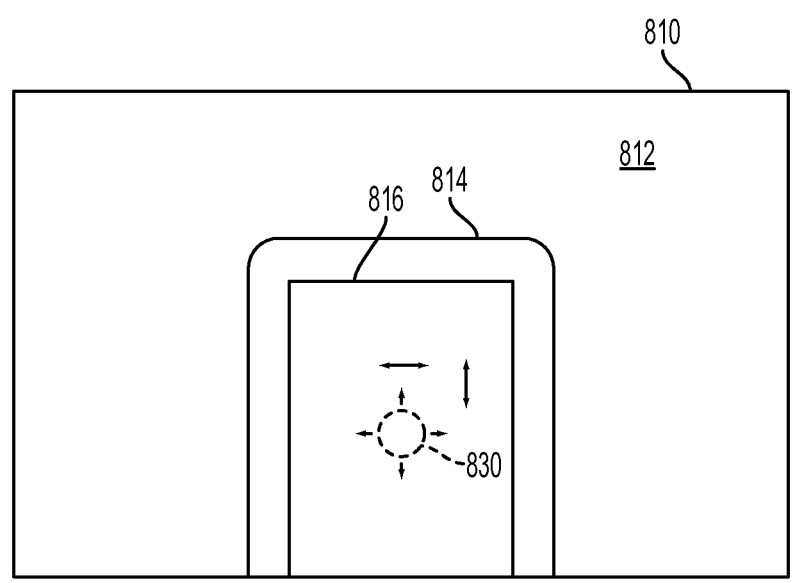
FIG. 8D illustrates transference of touch/gesture input received at a real-world controller device to a virtual display device in a virtual environment, in accordance with an embodiment of the invention.

FIG. 8C illustrates a top view of the controller device 804, in accordance with an embodiment of the invention. In some implementations, the controller device 804 includes a touch sensitive surface 820 that is configured to receive touch/gesture input from the user 800. The touch input can include such actions as taps, multi-taps, swipes, and other types of touch-based inputs. These can be applied on the display 816 of the virtual display device 814 to effect control of the text information that is being displayed, as shown with reference to FIG. 8D. For example, swiping up and down on the touch sensitive surface 820 may effect scrolling of text information that is rendered on the virtual display device 814.

The touch/gesture input received at the touch sensitive surface 820 is effectively transferred to the virtual display device 814. In other words, the virtual display device 814 is configured to have a touch sensitive display 816 in the virtual environment 812, and inputs provided to this virtual display 816 are defined by inputs which are received at the touch sensitive surface 820 of the controller device 804. In this manner, the user controls a virtual touch sensitive surface defined by the display device 814 in the virtual environment 812 by providing touch-based input in the real world.

In some implementations, an indication of the location of a touch input received at the touch sensitive surface 820 can be provided to aid the user in understanding where the touch input is being applied on the virtual display device 814. For example, with continued reference to FIG. 8C, the user may touch the touch sensitive surface 820 at a location 822. In response, in the view 810 of the virtual environment 812, an indicator 830 can be rendered on the virtual display 816 that indicates the current location of the user's touch input. It will be appreciated that the indicator 830 can have any type of graphical form to indicate the location of the user's touch input.

Furthermore, the indication of the location of the user's touch input on the virtual display 816 can be coupled with rendering of the positioning and movement of the user's hand, as has been discussed. For example, in one implementation, a rendering of the user's hand in the virtual environment can be configured to show the tip of the index finger touching the virtual display 816 indicator 830. In addition to a display of an indicator 830 that shows the current location of a touch input, gestures such as swipes can be represented on the virtual display 816 by additional graphical representations such as a trail following the indicator 830.

Figure 9:
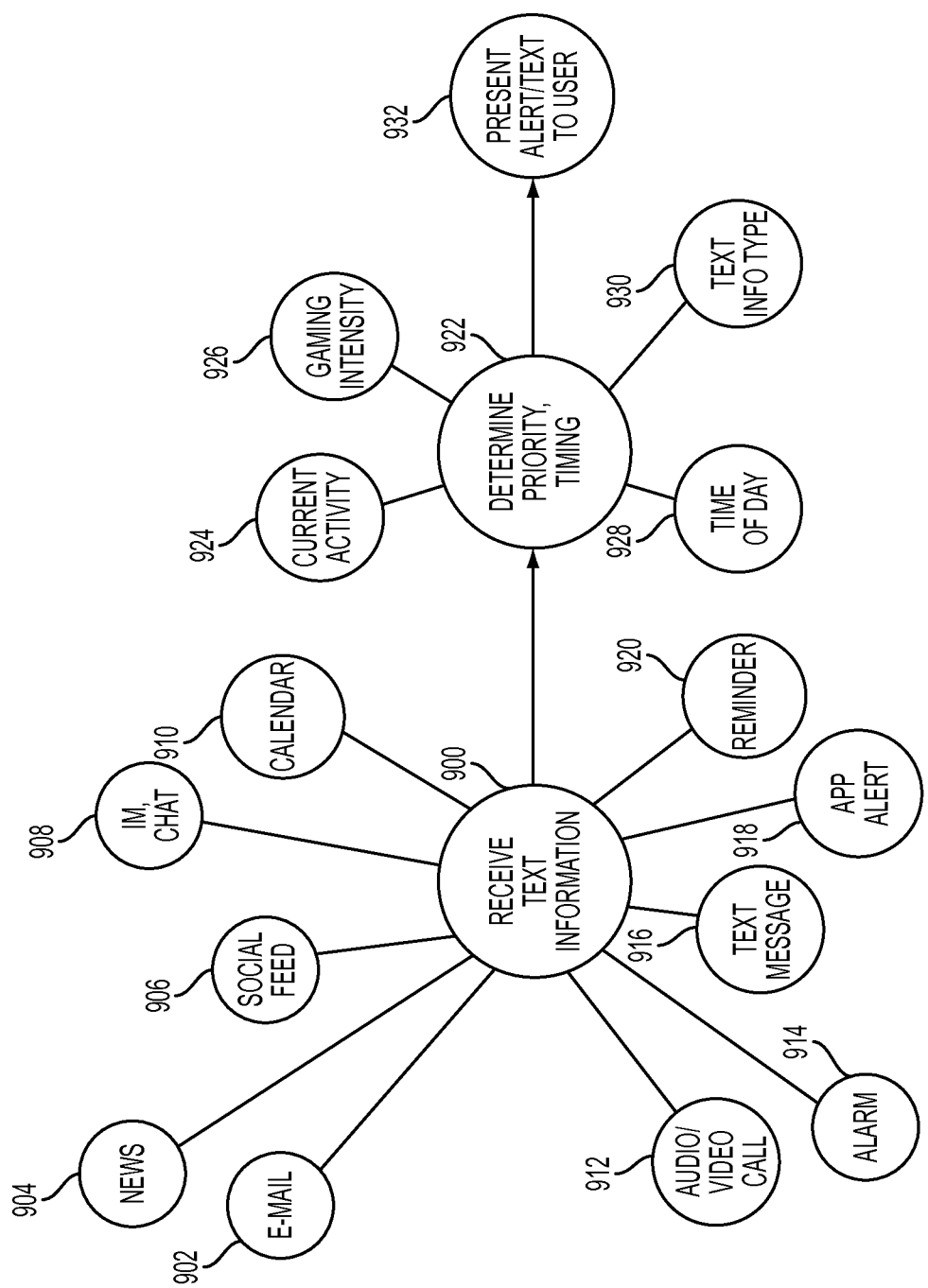
FIG. 9 is a flow diagram conceptually illustrating a process for presenting text information to a user in a virtual environment.

FIG. 9 is a flow diagram conceptually illustrating a process for presenting text information to a user in a virtual environment. At operation 900, text information is received from at least one of various sources of text information. By way of example and not limitation, the various sources of text information include e-mail 902, news 904, social networking feed 906, instant messaging/chat 908, calendar events 910, audio/video call 912, alarm 914, text message 916, application alert 918, a reminder 920, etc.

At operation 922, the priority and timing for the display of the text information to the user is determined. It will be appreciated that in various implementations, the timing and priority of display of text information, in a virtual environment in which the user is interacting, can be determined based on a wide variety of factors, and that any of such factors can be utilized alone or in combination with others to determine the timing and priority of the display of text information. Broadly speaking, the timing of the display entails the determination of when to display text information, after such information (or a notification that such information is available for display) has been received. The determination of the timing of display of text information can be dependent upon the prioritization of the text information relative to other factors, as discussed below. Generally speaking, higher prioritization of text information will result in immediate or more immediate display as compared to a lower prioritization, which will result in more delayed display or no display at all.

By way of example, the timing and priority of the display of text information can be determined, at least in part, based on a user's current activity 924. The current activity of the user can be defined by a variety of activities/factors, including the following, without limitation: whether the user is currently engaged in active gameplay, a specific game that the user is playing, a specific level or scene of the game, input that is being provided by the user (e.g. via an HMD device, a controller device, or other input device) and/or a quantified amount thereof (e.g. rate of input), movement of the user or an amount or rate thereof, voice commands or other spoken sound by the user, detected biometric data of the user (e.g. heart rate, respiration rate, temperature, galvanic skin resistance, etc.), a level of activity of the user, etc. In some implementations, text information is not displayed during certain types of user activity, and/or are displayed when such types of user activity cease.

In some embodiments, the timing and priority of text information may be determined, at least in part, based on a current level of gaming intensity. The gaming intensity can be determined based on activity occurring in a game in which the user is interacting. By way of example, without limitation, the gaming intensity may be determined based on one or more of the following: an amount or density of visual elements present in the virtual environment with which the user is interacting, movement of the user or an object/character/vehicle under control of the user (e.g. a velocity or speed), usage of a weapon/tool/object in the virtual environment, input provided by the user for the video game, number/density of virtual characters present in the virtual environment, etc. Broadly speaking, it may be desirable not to interrupt the user during periods of high gaming intensity, and so during such periods, the display of text information may be delayed until a period of lower gaming intensity occurs. In some implementations, text information (or an alert/notification regarding the text information) may not be presented when the level of gaming intensity exceeds a predefined threshold (and conversely, text information may or will be presented when the level of gaming intensity does not exceed a predefined threshold). Additionally, the predefined threshold for such presentation may vary depending upon the type of text information 930, discussed in further detail below.

In some implementations, the timing and priority of the display of text information is determined, at least in part, based on the time of day 928. For example, during certain hours (e.g. the evening), the user may not wish to be interrupted or disturbed, and so text information from sources external to the gameplay of a video game (or other activity in which the user is engaged) is deprioritized for display during these hours.

In some implementations, the prioritization and timing of the display of text information can be determined, at least in part, based on the type of text information. For example, in one implementation, a text message may be prioritized over an e-mail, such that during certain scenarios, the text message will be displayed to the user, whereas the e-mail will not. Various types of text information may have different thresholds for display relative to other factors under consideration for purposes of determining whether and when to display such text information.

Furthermore, in some implementations, the prioritization and timing of the display of text information can be determined based on user-configurable settings.

In some implementations, text information is displayed during certain predefined times during the course of gameplay, such as during transitions between levels or scenes, when re-spawning, when the game is paused, when gameplay ends, during presentation of game results, etc.

It should be appreciated that though in the foregoing description, reference is made to the prioritization and timing of the display of text information, that such applies as well to the display or rendering of a notification or alert regarding the availability of the text information for display.

Figure 10:
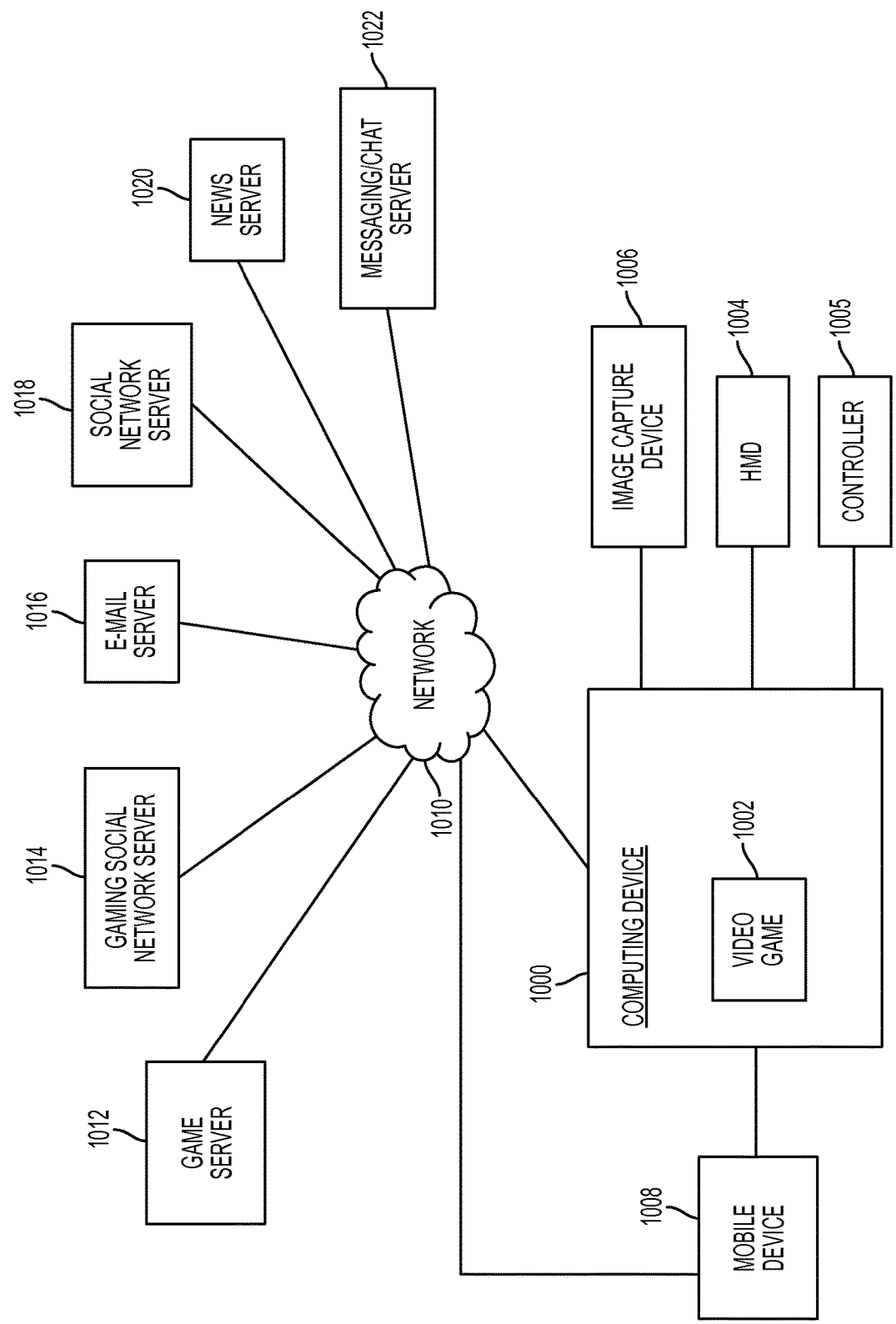
FIG. 10 illustrates a system for rendering text information on a head-mounted display to a user, in accordance with an embodiment of the invention.

FIG. 10 illustrates a system for rendering text information on a head-mounted display to a user, in accordance with an embodiment of the invention. A computing device 1000 is configured to execute a video game 1002. The computing device 1000 may communicate over a network 1010 to a game server 1012. In some embodiments, the game server 1012 is configured to store various types of information related to the video game 1002, such as player progress, achievements, resources, etc. The game server 1012 may also facilitate multiplayer gaming over the network 1010, and so the game server 1012 may communicate with other computing devices, which may execute other instances of the video game. In cloud gaming implementations, the game server 1012 is configured to execute the video game and provide video and audio data to the computing device 1000, with the computing device 1000 configured to act as a remote terminal or interface for communication with the executing video game at the game server 1012. In some implementations, the game server 1012 may instantiate the video game in a virtual machine.

A head-mounted display 1004 communicates with the computing device 1000. The head-mounted display 1004 may receive video and audio data from the computing device 1000 for rendering on the head-mounted display 1004. Furthermore, the head-mounted display 1004 may communicate input data to the computing device 1000, such as inertial sensor data, image capture data, gaze tracking data, and other types of data which can be detected or processed by the head-mounted display 1004. A controller device 1005 is additionally provided as another input device for providing input to the videogame 1002.

An image capture device 1006 is configured to capture images of the real world interactive environment in which a user operates the head-mounted display 1004 and the controller 1005. The computing device 1000 can be configured to process these captured images, to identify the position/location/orientation of various elements in the interactive environment, such as the user or parts of the user, the head-mounted display 1004, the controller device 1005, or any other element in the interactive environment. Additionally, the image capture device 1006 can include at least one microphone for capturing sound from the interactive environment. In some implementations, a plurality of microphones are included to enable sound localization, that is, identification of locations from which sounds in the interactive environment are produced, and/or specific sources of such sounds (e.g. a user).

The executing videogame can define a virtual environment, and a view of the virtual environment can be rendered on the head-mounted display 1004 for viewing by the user.

In some implementations, a mobile device 1008 communicates with the computing device 1000. The computing device 1000 may be configured to receive from the mobile device 1008 text information for display to the user. In response to receiving the text information, the computing device 1000 can be configured to determine when and how to render such text information on the head-mounted display device 1004. In various implementations, the mobile device 1008 can be configured to receive various types of text information, such as e-mail, social network updates, text messages, instant messages, chat messages, etc. The mobile device 1008 may therefore communicate with various servers to receive such text information, such as the various servers which are shown and described with reference to FIG. 10.

In additional implementations, the mobile device 1008 may communicate directly with the head-mounted display 1004 to achieve similar or the same functionality as that described above regarding notification and/or display of text information to the user.

A gaming social network server 1014 provides for a gaming social network, and also provides updates regarding the gaming social network (e.g. posts, news, etc.) to the computing device 1000, for display on the head-mounted display 1004. An e-mail server 1016 provides for an e-mail account of the user, for which updates (e.g. new messages, etc.) can be provided to the computing device 1004 display on the head-mounted display 1004. A social network server 1018 provides for a social network that is distinct from the aforementioned gaming social network. The social network server 1018 can likewise provide updates regarding activity on the social network to the computing device 1000 for display on the HMD device 1004. A news server 1020 can be configured to provide a news feed to the computing device 1000, including headlines, articles, or other news information, for display on the HMD device 1004. A messaging/chat server 1022 provides for a messaging/chat service, such as text messaging, instant messaging, text/voice/video chat, etc. The messaging/chat server can be configured to communicate messaging/chat information, such as notifications and/or message/chat content, to the computing device 1000 for rendering to the HMD device 1004.

Though the aforementioned servers have been described as communicating various kinds of text information to the computing device 1000, it should be appreciated that a given server may first communicate such information to the game server 1012, which may in turn relay the text information to the computing device 1000.

Embodiments in accordance with the present disclosure provide technical solutions to the problem of how to present text on a head-mounted display. The highly immersive experience afforded by a head-mounted display is in contrast to that of a conventional display, such as a television, which provides an inherently available defined object surface on which text information can be rendered. However, in the case of a head-mounted display, when viewing an immersive three-dimensional environment on an HMD, such an object may not exist, and the presentation of text information can be awkward or unnatural. Therefore, embodiments of the present invention provide a technical solution to these problems utilizing various technologies as described herein. In some embodiments, the HMD includes hardware for enabling tracking of the location and orientation of the HMD, such as inertial sensors and/or trackable illuminated objects defined thereon. The location/orientation of the HMD can be processed by a computing device to identify a view direction of the user, and based on the identified view direction, data for the presentation of text information can be generated and sent to the HMD to effect display of the text information thereon in an appropriate manner. In other embodiments, the user may be holding a controller device separate from the HMD, and the controller device can be manipulated by the user and appear in the virtual environment as an object, such as an electronic display device, on which the text information is displayed.

Figure 11B:
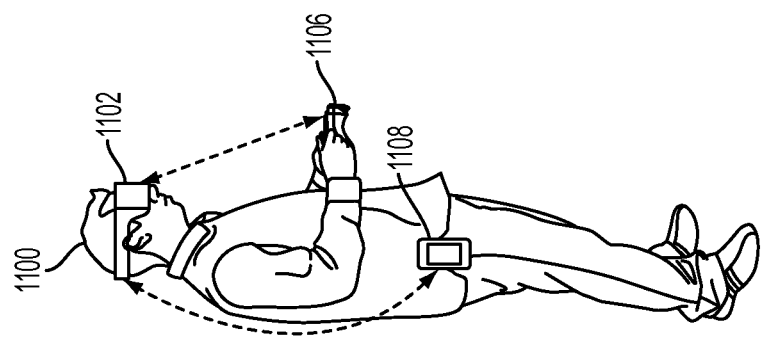
FIG. 11B illustrates a configuration for operating a head-mounted display device, in accordance with an embodiment of the invention.
Figure 11A:
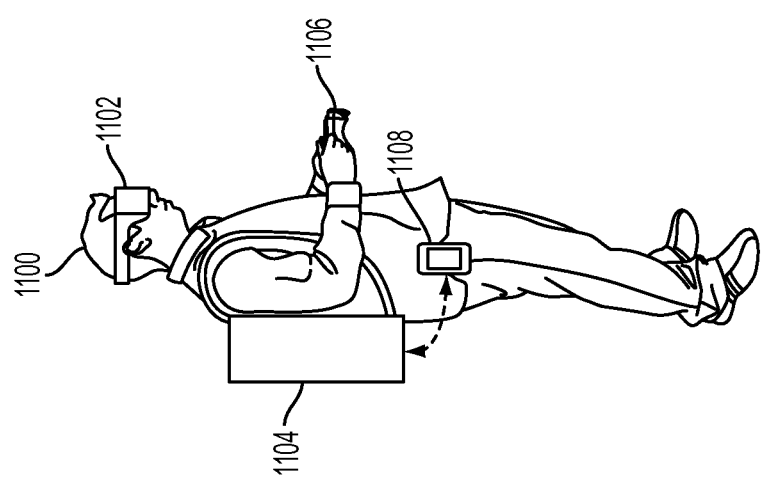
FIG. 11A illustrates a configuration for operating a head-mounted display device, in accordance with an embodiment of the invention.

FIG. 11A illustrates a configuration for operating a head-mounted display device, in accordance with an embodiment of the invention. In the illustrated embodiment, a user 1100 is shown wearing an HMD device 1102. The HMD device 1102 is connected to a wearable computing device 1104. In one embodiment, the wearable computing device 1104 is in the form factor of a backpack or other body-attached unit. A controller 1106 is operated by the user 1100, and communicates input data to the computing device 1104. The user 1100 may have a mobile device 1108 (e.g. a cellular phone) that communicates to the computing device 1104. The wearable computing device 1104 can be configured to execute a video game, and provide video and audio data to the HMD device 1102 for rendering a view of a virtual environment defined by the video game.

FIG. 11B illustrates another configuration for operating a head-mounted display device, in accordance with an embodiment of the invention. In the embodiment of FIG. 11B, the mobile device 1108 communicates directly with the HMD device 1102. In some implementations, the HMD device 1102 is configured to execute the video game. The HMD device 1102 may therefore also communicate with the controller device 1106 to receive input data, and may also receive text information from the mobile device 1108 for rendering on the HMD device 1102. In yet another implementation, the videogame can be executed by the mobile device 1108. The mobile device 1108 can therefore be configured to provide video and audio data for rendering to the HMD device 1102. In such an embodiment, the mobile device 1108 and communicates with the controller device 1106 to receive input data.

Various embodiments described herein have been described with reference to video games presented on a head-mounted display device. However, it will be appreciated that in accordance with other embodiments, the principles and methods thus described may also be applied in the context of other types of interactive applications, and in the context of presentation on other types of devices, including but not limited to televisions and other types of displays on which interactive applications may be presented.

Figure 12:
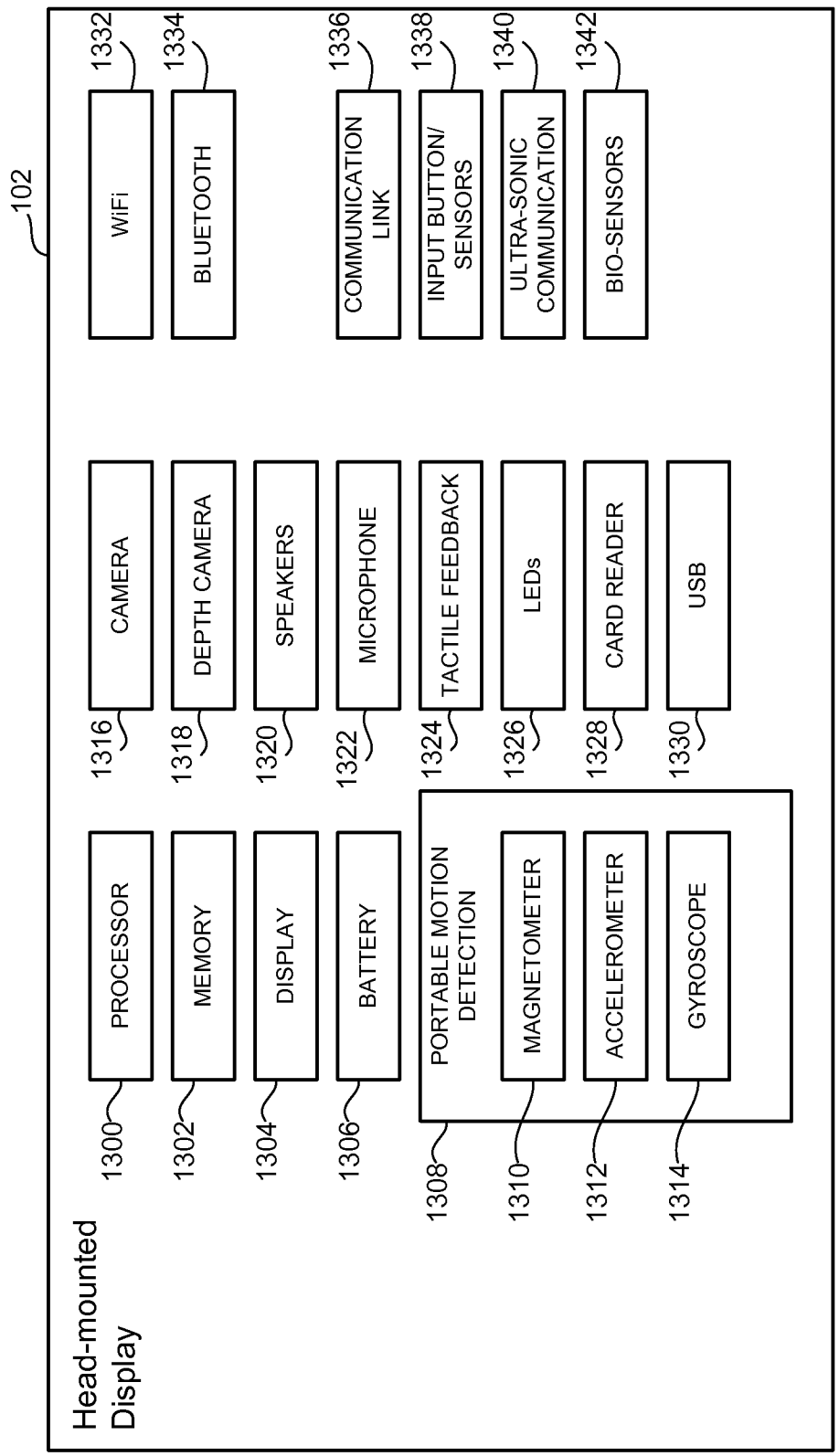
FIG. 12 illustrates components of a head-mounted display, in accordance with an embodiment of the invention.

With reference to FIG. 12, a diagram illustrating components of a head-mounted display 102 is shown, in accordance with an embodiment of the invention. The head-mounted display 102 includes a processor 1300 for executing program instructions. A memory 1302 is provided for storage purposes, and may include both volatile and non-volatile memory. A display 1304 is included which provides a visual interface that a user may view. A battery 1306 is provided as a power source for the head-mounted display 102. A motion detection module 1308 may include any of various kinds of motion sensitive hardware, such as a magnetometer 1310, an accelerometer 1312, and a gyroscope 1314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1312 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1310 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1312 is used together with magnetometer 1310 to obtain the inclination and azimuth of the head-mounted display 102.

A gyroscope is a device for measuring or maintaining orientation, based on the principles of angular momentum. In one embodiment, three gyroscopes 1314 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as location/orientation determination based on visual tracking of an object, accelerometer, magnetometer, etc.

A camera 1316 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1318 may be included in the head-mounted display 102 for sensing depth information of objects in a real environment.

The head-mounted display 102 includes speakers 1320 for providing audio output. Also, a microphone 1322 may be included for capturing audio from the real environment, including sounds from the ambient environment, speech made by the user, etc. The head-mounted display 102 includes tactile feedback module 1324 for providing tactile feedback to the user. In one embodiment, the tactile feedback module 1324 is capable of causing movement and/or vibration of the head-mounted display 102 so as to provide tactile feedback to the user.

LEDs 1326 are provided as visual indicators of statuses of the head-mounted display 102. For example, an LED may indicate battery level, power on, etc. A card reader 1328 is provided to enable the head-mounted display 102 to read and write information to and from a memory card. A USB interface 1330 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 1332 is included for enabling connection to the Internet via wireless networking technologies. Also, the head-mounted display 102 includes a Bluetooth module 1334 for enabling wireless connection to other devices. A communications link 1336 may also be included for connection to other devices. In one embodiment, the communications link 1336 utilizes infrared transmission for wireless communication. In other embodiments, the communications link 1336 may utilize any of various wireless or wired transmission protocols for communication with other devices.

Input buttons/sensors 1338 are included to provide an input interface for the user. Any of various kinds of input interfaces may be included, such as buttons, touchpad, joystick, trackball, etc. An ultra-sonic communication module 1340 may be included in head-mounted display 102 for facilitating communication with other devices via ultrasonic technologies.

Bio-sensors 1342 are included to enable detection of physiological data from a user. In one embodiment, the bio-sensors 1342 include one or more dry electrodes for detecting bio-electric signals of the user through the user's skin.

The foregoing components of head-mounted display 102 have been described as merely exemplary components that may be included in head-mounted display 102. In various embodiments of the invention, the head-mounted display 102 may or may not include some of the various aforementioned components. Embodiments of the head-mounted display 102 may additionally include other components not presently described, but known in the art, for purposes of facilitating aspects of the present invention as herein described.

It will be appreciated by those skilled in the art that in various embodiments of the invention, the aforementioned head-mounted display may be utilized in conjunction with an interactive application to provide various interactive functions. The exemplary embodiments described herein are provided by way of example only, and not by way of limitation. Furthermore, it will be appreciated that embodiments of the invention may be practiced with other types of worn or non-worn displays that are operable by a user, such as augmented reality glasses/goggles/displays, heads-up displays, handheld displays, portable displays, etc.

Figure 13:
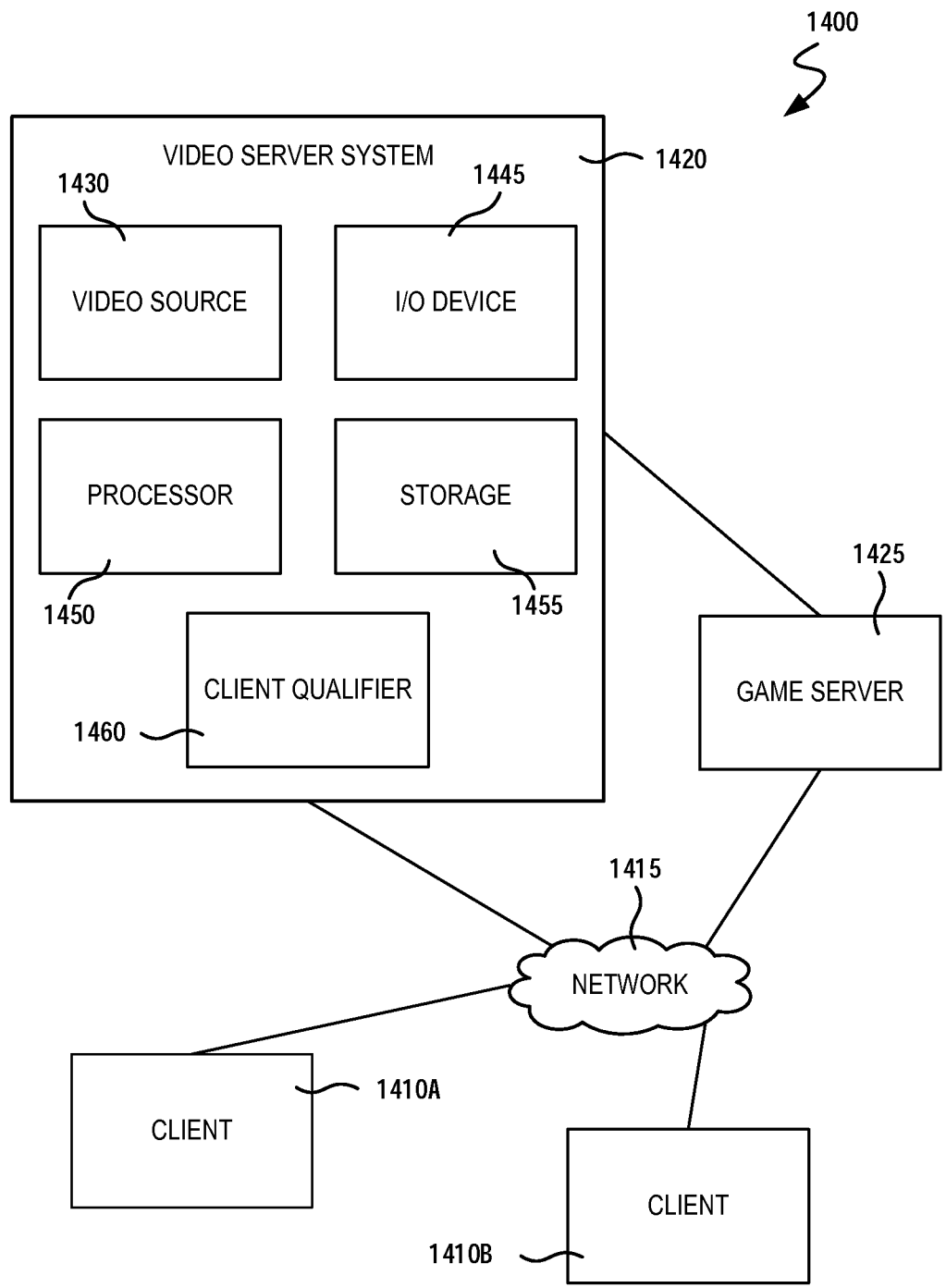
FIG. 13 is a block diagram of a Game System, according to various embodiments of the invention.

FIG. 13 is a block diagram of a Game System 1400, according to various embodiments of the invention. Game System 1400 is configured to provide a video stream to one or more Clients 1410 via a Network 1415. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change in state with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 1420 frames per second. Although higher or lower frame rates are included in alternative embodiments of the invention.

Clients 1410, referred to herein individually as 1410A, 1410B, etc., may include head-mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command. Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multi-player game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream, optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for presenting text information on a head-mounted display, comprising:
    rendering a view of a virtual environment to the head-mounted display;
    tracking an orientation of the head-mounted display;
    tracking a gaze of a user of the head-mounted display;
    processing the gaze of the user and the orientation of the head-mounted display, to identify a gaze target in the virtual environment towards which the gaze of the user is directed;
    receiving text information for rendering on the head-mounted display;
    responsive to receiving the text information, rendering in the virtual environment a virtual device in place of a handheld device held by the user, so that when the gaze of the user defines a real world view direction towards the handheld device then the virtual device is rendered in place of the handheld device in the virtual environment as presented through the head-mounted display, and presenting the text information on the virtual device in the virtual environment in a vicinity of the gaze target, wherein the virtual device is maneuverable in the virtual environment in response to detected movement of the handheld device, such that movement of the virtual device in the virtual environment is tracked to the detected movement of the handheld device.

2. The method of claim 1,
    wherein the gaze target defines a view depth in the virtual environment, the view depth defined relative to a virtual viewpoint in the virtual environment that is defined for the head-mounted display and that defines a perspective from which the view of the virtual environment is rendered;
    wherein the text information is presented in the virtual environment at approximately the view depth.

3. The method of claim 2, wherein the text information is presented in the virtual environment at a lateral location relative to the gaze target.

4. The method of claim 2, wherein the text information is presented on an object in the virtual environment that is located at approximately the view depth.

5. The method of claim 1, wherein the text information is presented at a location defined by the gaze target.

6. The method of claim 1,
    wherein the gaze target identifies an object in the virtual environment; and wherein the text information is presented on the object in the virtual environment.

7. The method of claim 1, wherein determining the orientation of the head-mounted display includes capturing images of the head-mounted display and analyzing the captured images of the head-mounted display.

8. The method of claim 1, wherein determining the orientation of the head-mounted display includes processing data received from at least one inertial sensor included in the head-mounted display.

9. The method of claim 1, wherein tracking the gaze of the user includes tracking an orientation of an eye of the user.

10. The method of claim 1, further comprising:
tracking a location of the head-mounted display;
wherein processing to identify the gaze target in the virtual environment includes processing the location of the head-mounted display.

11. A method for displaying text on a head-mounted display, comprising:
rendering a view of a virtual environment on a head-mounted display;
receiving text information for display to a user of the head-mounted display;
tracking a location and orientation of a controller device in a vicinity of the head-mounted display;
in response to the receiving text information, rendering, in the view of the virtual environment, a virtual display device in place of the controller device held by the user, so that when a gaze of the user defines a real world view direction towards the controller device then the virtual device is rendered in place of the controller device in the virtual environment as presented through the head-mounted display, the virtual display device configured to display the text information, and a location and orientation of the virtual display device in the virtual environment being controlled based on the tracked location and orientation of the controller device.

12. The method of claim 11, further comprising:
receiving input from a touch-sensitive surface of the controller device;
processing the input to define an interaction with the text information as it is displayed on the virtual display device.

13. The method of claim 12, wherein the interaction with the text information is selected from scrolling the text information, moving the text information, adjusting a level of zoom, and selecting a portion of the text information.

14. The method of claim 11, wherein the location and orientation of the virtual display device in the virtual environment are controlled so as to be tracked to the tracked location and orientation of the controller device.

15. A method for displaying text on a head-mounted display, comprising:
rendering a view of a virtual environment to a head-mounted display;
receiving text information for display on the head-mounted display;
in response to the receiving text information, rendering an alert to the head-mounted display;
detecting a predefined response to the alert;
in response to detecting the predefined response to the alert, rendering in the virtual environment a virtual device in place of a controller device held by the user, so that when a gaze of the user defines a real world view direction towards the controller device then the virtual device is rendered in place of the controller device in the virtual environment as presented through the head-mounted display, and rendering the text information on the virtual device, wherein the virtual device is maneuverable in the virtual environment in response to detected movement of the controller device, such that movement of the virtual device in the virtual environment is tracked to the detected movement of the controller device.

16. The method of claim 15,
wherein the alert is defined by display of a visual indicator on the head-mounted display;
wherein the predefined response is defined by detection of a view direction of a user of the head-mounted display that is towards the visual indicator.

17. The method of claim 16, wherein detection of the view direction of the user of the head-mounted display includes determining a gaze direction of the user's eyes.

18. The method of claim 15,
wherein the predefined response is defined by detection of a movement of the controller device towards the head-mounted display.

19. The method of claim 15, wherein in response to gesture input detected from a touch-sensitive surface of the controller device, an interaction with the rendered text information on the virtual display device is defined.

20. A head-mounted display configured to present text information, comprising:
a receiver configured to receive video data;
at least one display configured to render the video data, the rendered video data defining a view of a virtual environment;
at least one device for tracking an orientation of the head-mounted display;
at least one device for tracking a gaze of a user of the head-mounted display, the gaze of the user and the orientation of the head-mounted display being processed to identify a gaze target in the virtual environment towards which the gaze of the user is directed;
wherein rendering the video data defines, responsive to receiving the text information, rendering in the virtual environment a virtual device in place of a handheld device held by the user, so that when the gaze of the user defines a real world view direction towards the handheld device then the virtual device is rendered in place of the handheld device in the virtual environment as presented through the head-mounted display, and rendering the video data further defines a presentation of the text information on the virtual device in the virtual environment in a vicinity of the gaze target, wherein the virtual device is maneuverable in the virtual environment in response to detected movement of the handheld device, such that movement of the virtual device in the virtual environment is tracked to the detected movement of the handheld device.

21. The head-mounted display of claim 20,
wherein the gaze target defines a view depth in the virtual environment, the view depth defined relative to a virtual viewpoint in the virtual environment that is defined for the head-mounted display and that defines a perspective from which the view of the virtual environment is rendered;
wherein the text information is presented in the virtual environment at approximately the view depth.

22. The head-mounted display of claim 21, wherein the text information is presented in the virtual environment at a lateral location relative to the gaze target.

23. The head-mounted display of claim 21, wherein the text information is presented on an object in the virtual environment that is located at approximately the view depth.

24. The head-mounted display of claim 20, wherein the text information is presented at a location defined by the gaze target.

25. The head-mounted display of claim 20,
wherein the gaze target identifies an object in the virtual environment; and
wherein the text information is presented on the object in the virtual environment.

26. The head-mounted display of claim 20, wherein the at least one device for tracking the orientation of the head-mounted display includes an illuminated object, the orientation of the head-mounted display being tracked by identifying the illuminated object in captured images of the head-mounted display.

27. The head-mounted display of claim 20, wherein the at least one device for tracking the orientation of the head-mounted display includes at least one inertial sensor, wherein the orientation of the head-mounted display is determined from data processed from the at least one inertial sensor.

28. The head-mounted display of claim 20, wherein tracking the gaze of the user includes tracking an orientation of an eye of the user.

29. The head-mounted display of claim 20, wherein the text information is defined by one or more of an instant message, an e-mail, a chat message, a social network notification, a phone notification.

30. A head-mounted display configured to present text information, comprising:
a receiver configured to receive video data;
at least one display configured to render the video data, the rendered video data defining a view of a virtual environment;
at least one device for tracking location of the head-mounted display;
at least one device for tracking a gaze of a user of the head-mounted display, the gaze of the user and the location of the head-mounted display being processed to identify a gaze target in the virtual environment towards which the gaze of the user is directed;
wherein rendering the video data defines, responsive to receiving the text information, rendering in the virtual environment a virtual device in place of a controller device held by the user, so that when the gaze of the user defines a real world view direction towards the controller device then the virtual device is rendered in place of the controller device in the virtual environment as presented through the head-mounted display, and rendering of the video data further defines a presentation of the text information on the virtual device in the virtual environment in a vicinity of the gaze target, wherein the virtual device is maneuverable in the virtual environment in response to detected movement of the controller device, such that movement of the virtual device in the virtual environment is controlled based on the detected movement of the controller device.

* * * * *